US011233299B2

United States Patent
Evans et al.

(10) Patent No.: US 11,233,299 B2
(45) Date of Patent: Jan. 25, 2022

(54) INTERNALLY MANIFOLDED FLOW CELL FOR AN ALL-IRON HYBRID FLOW BATTERY

(71) Applicant: ESS TECH, INC., Wilsonville, OR (US)

(72) Inventors: Craig Evans, West Linn, OR (US); Yang Song, West Linn, OR (US)

(73) Assignee: ESS TECH, INC., Wilsonville, OR (US)

( * ) Notice: Subject to any disclaimer, the term of this patent is extended or adjusted under 35 U.S.C. 154(b) by 138 days.

(21) Appl. No.: 16/548,500

(22) Filed: Aug. 22, 2019

(65) Prior Publication Data

US 2020/0006744 A1  Jan. 2, 2020

Related U.S. Application Data

(60) Division of application No. 15/476,795, filed on Mar. 31, 2017, now Pat. No. 10,439,197, which is a (Continued)

(51) Int. Cl.
*H01M 50/60* (2021.01)
*H01M 8/18* (2006.01)
(Continued)

(52) U.S. Cl.
CPC ....... *H01M 50/60* (2021.01); *H01M 8/04186* (2013.01); *H01M 8/188* (2013.01);
(Continued)

(58) Field of Classification Search
None
See application file for complete search history.

(56) References Cited

U.S. PATENT DOCUMENTS

| 4,037,023 A | 7/1977 | Grehier et al. |
| 4,786,567 A | 11/1988 | Skyllas-Kazacos et al. |

(Continued)

FOREIGN PATENT DOCUMENTS

| WO | 0225754 A1 | 3/2002 |
| WO | 2011075135 A1 | 6/2011 |
| WO | 2012167057 A2 | 12/2012 |

OTHER PUBLICATIONS

Mellentine et al., "Performance characterization and cost assessment of an iron hybrid flow battery", University of Iceland, Jan. 2011, thesis paper, pp. 1-136 (Year: 2011).*

(Continued)

*Primary Examiner* — Daniel S Gatewood
(74) *Attorney, Agent, or Firm* — McCoy Russell LLP

(57) ABSTRACT

In one example, a system for a flow cell for a flow battery, comprising: a first flow field; and a polymeric frame, comprising: a top face; a bottom face, opposite the top face; a first side; a second side, opposite the first side; a first electrolyte inlet located on the top face and the first side of the polymeric frame; a first electrolyte outlet located on the top face and the second side of the polymeric frame; a first electrolyte inlet flow path located within the polymeric frame and coupled to the first electrolyte inlet; and a first electrolyte outlet flow path located within the polymeric frame and coupled to the first electrolyte outlet. In this way, shunt currents may be minimized by increasing the length and/or reducing the cross-sectional area of the electrolyte inlet and electrolyte outlet flow paths.

10 Claims, 9 Drawing Sheets

Related U.S. Application Data division of application No. 14/019,491, filed on Sep. 5, 2013, now Pat. No. 9,685,651, and a continuation of application No. 14/019,488, filed on Sep. 5, 2013, now Pat. No. 9,614,244.

(60) Provisional application No. 61/778,160, filed on Mar. 12, 2013, provisional application No. 61/697,202, filed on Sep. 5, 2012.

(51) Int. Cl.
  *H01M 8/20* (2006.01)
  *H01M 8/04186* (2016.01)

(52) U.S. Cl.
  CPC .............. *H01M 8/20* (2013.01); *Y02E 60/50* (2013.01); *Y10T 137/4757* (2015.04)

(56) References Cited

U.S. PATENT DOCUMENTS

| | | | |
|---|---|---|---|
| 5,318,865 A | 6/1994 | Kaneko et al. | |
| 5,368,762 A | 11/1994 | Sato et al. | |
| 5,665,212 A | 9/1997 | Zhong et al. | |
| 6,143,443 A | 11/2000 | Kazacos et al. | |
| 6,228,518 B1 | 5/2001 | Kindler | |
| 6,468,688 B2 | 10/2002 | Kazacos et al. | |
| 6,475,661 B1* | 11/2002 | Pellegri ............. | H01M 8/04186 429/105 |
| 6,509,119 B1 | 1/2003 | Kobayashi et al. | |
| 6,562,514 B1 | 5/2003 | Kazacos et al. | |
| 6,666,961 B1 | 12/2003 | Skoczylas et al. | |
| 6,764,663 B2 | 7/2004 | Monaghan et al. | |
| 6,764,789 B1 | 7/2004 | Sekiguchi et al. | |
| 6,872,376 B2 | 3/2005 | Tanaka et al. | |
| 6,986,966 B2 | 1/2006 | Clarke et al. | |
| 7,033,696 B2 | 4/2006 | Clarke et al. | |
| 7,078,123 B2 | 7/2006 | Kazacos et al. | |
| 7,083,774 B2 | 8/2006 | Dormehl et al. | |
| 7,214,443 B2 | 5/2007 | Clarke et al. | |
| 7,265,456 B2 | 9/2007 | Hennessy | |
| 7,270,911 B2 | 9/2007 | Clarke et al. | |
| 7,297,437 B2 | 11/2007 | Clarke et al. | |
| 7,353,083 B2 | 4/2008 | Hennessy | |
| 7,452,486 B2 | 11/2008 | Martyak et al. | |
| 7,557,531 B2 | 7/2009 | Willets et al. | |
| 7,560,189 B2 | 7/2009 | Clarke et al. | |
| 7,625,662 B2 | 12/2009 | Vaisnys et al. | |
| 7,740,977 B2 | 6/2010 | Lepp et al. | |
| 7,855,005 B2 | 12/2010 | Sahu | |
| 7,919,204 B2 | 4/2011 | Sahu | |
| 7,927,731 B2 | 4/2011 | Sahu | |
| 7,993,932 B2 | 8/2011 | Winter | |
| 2001/0006745 A1 | 7/2001 | Bronoel et al. | |
| 2002/0119090 A1 | 8/2002 | Tanaka et al. | |
| 2003/0215695 A1 | 11/2003 | Suzuki et al. | |
| 2004/0241552 A1 | 12/2004 | Skyllas-Kazacos | |
| 2005/0244707 A1 | 11/2005 | Skyllas-Kazacos et al. | |
| 2005/0287436 A1 | 12/2005 | Kawashige et al. | |
| 2007/0072067 A1 | 3/2007 | Symons et al. | |
| 2009/0047571 A1 | 2/2009 | Harper | |
| 2009/0218984 A1 | 9/2009 | Parakulam | |
| 2010/0003586 A1 | 1/2010 | Sahu | |
| 2010/0090651 A1 | 4/2010 | Sahu et al. | |
| 2010/0092757 A1 | 4/2010 | Nair et al. | |
| 2010/0092843 A1 | 4/2010 | Conway | |
| 2010/0119937 A1 | 5/2010 | Winter | |
| 2010/0178533 A1 | 7/2010 | Whitehead et al. | |
| 2010/0261070 A1 | 10/2010 | Keshavarz et al. | |
| 2010/0291420 A1 | 11/2010 | Kazacos et al. | |
| 2011/0074357 A1 | 3/2011 | Parakulam et al. | |
| 2011/0117411 A1 | 5/2011 | Horne et al. | |
| 2011/0206960 A1 | 8/2011 | Winter | |
| 2011/0223450 A1 | 9/2011 | Horne et al. | |
| 2011/0223451 A1 | 9/2011 | Winter et al. | |
| 2012/0052340 A1 | 3/2012 | la O' et al. | |
| 2012/0058370 A1 | 3/2012 | Kell et al. | |
| 2012/0328910 A1* | 12/2012 | la O' ................. | H01M 8/04186 429/51 |

OTHER PUBLICATIONS

Nguyen, T. et al., "Flow Batteries," The Electrochemical Society: Interface, vol. 19, No. 3, Fall 2010, 3 pages.

Izaki, M., "11. Electrodeposition of Iron and Iron Alloys," In Book: Modern Electroplating, Fifth Edition, Oct. 4, 2010, 18 pages.

Mellentine, J., "Performance Characterization and Cost Assessment of an Iron Hybrid Flow Battery," Master Thesis, University of Iceland and the University of Akureyri, Jan. 28, 2011, 136 pages.

Yang, Z., et al., "Electrochemical Energy Storage for Green Grid," Chemical Reviews, vol. 111, No. 5, May 11, 2011, Published Online Mar. 4, 2011, 37 pages.

Miller, A., "Ohio researchers study iron flow battery potential for solar storage," Clean Energy Authority Website, Available Online at http://www.cleanenergyauthority.com/solar-energy-news/iron-flow-battery-potential-for-solar-storage-052511/, May 25, 2011, 3 pages.

Perry, M., "Renaissance in Flow-Cell Technologies: Recent Advancements and Future Opportunities," United Technologies Research Center, Proceedings of the Flow Cells for Energy Storage Workshop, Mar. 7, 2012, Washington, D.C., 18 pages.

ISA Korean Intellectual Property Office, International Search Report and Written Opinion Issued in Application No. PCT/US2013/058342, dated Dec. 2, 2013, WIPO, 10 pages.

"Flow battery," Wikipedia Website, Available Online at https://en.wikipedia.org/wiki/Flow_battery, As Retrieved Jan. 27, 2014, 6 pages.

* cited by examiner

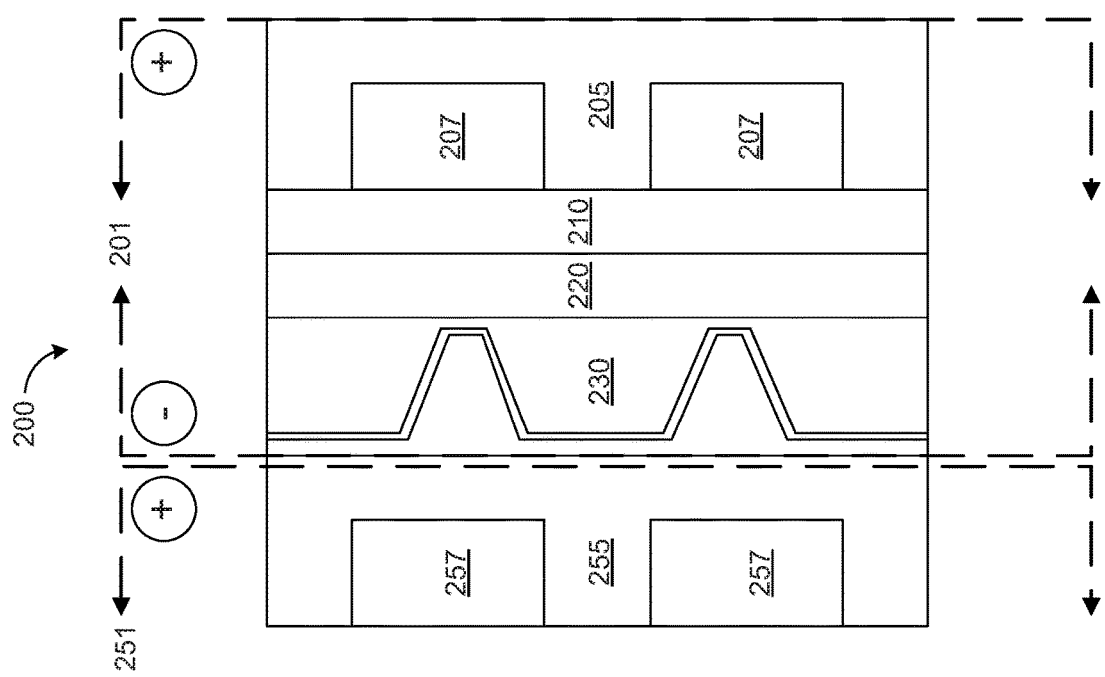

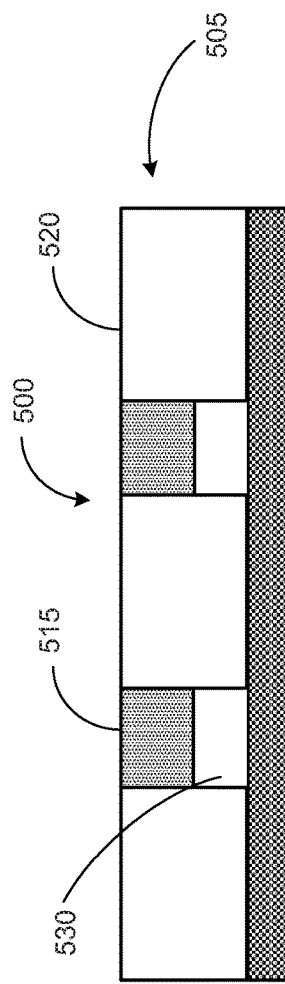
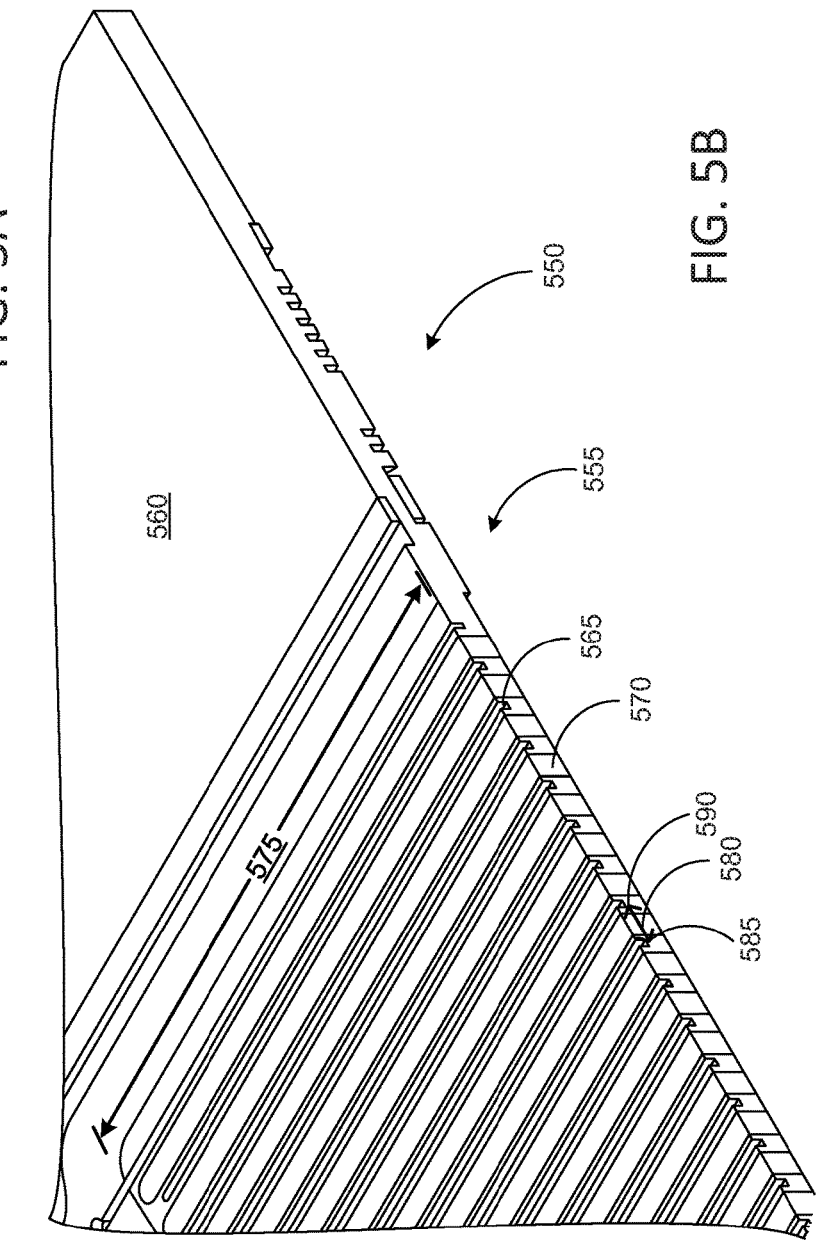

INTERNALLY MANIFOLDED FLOW CELL FOR AN ALL-IRON HYBRID FLOW BATTERY

CROSS-REFERENCE TO RELATED APPLICATIONS

The present application is a divisional of U.S. patent application Ser. No. 15/476,795 entitled "INTERNALLY MANIFOLDED FLOW CELL FOR AN ALL-IRON HYBRID FLOW BATTERY", filed Mar. 31, 2017. U.S. patent application Ser. No. 15/476,795 is a divisional of U.S. patent application Ser. No. 14/019,491 entitled "INTERNALLY MANIFOLDED FLOW CELL FOR AN ALL-IRON HYBRID FLOW BATTERY", filed Sep. 5, 2013, now U.S. Pat. No. 9,685,651. U.S. patent application Ser. No. 14/019,491 claims priority to U.S. Provisional Patent Application No. 61/697,202, entitled "ALL IRON HYBRID FLOW BATTERY", filed Sep. 5, 2012. U.S. patent application Ser. No. 15/476,795 is also a continuation of U.S. patent application Ser. No. 14/019,488, entitled "REDOX AND PLATING ELECTRODE SYSTEMS FOR AN ALL-IRON HYBRID FLOW BATTERY", filed Sep. 5, 2013, now U.S. Pat. No. 9,614,244. U.S. patent application Ser. No. 14/019,488 claims priority to U.S. Provisional Patent Application No. 61/697,202, entitled "ALL IRON HYBRID FLOW BATTERY", filed Sep. 5, 2012, and U.S. Provisional Patent Application No. 61/778,160, entitled "PLATING AND REDOX ELECTRODE SYSTEM AND DESIGN FOR AN ALL IRON REDOX FLOW BATTERY," filed Mar. 12, 2013. The entire contents of each of the above-referenced applications are hereby incorporated by reference for all purposes.

ACKNOWLEDGMENT OF GOVERNMENT SUPPORT

This invention was made with government support under contract no. DE-AR0000261 awarded by the DOE, Office of ARPA-E. The government has certain rights in the invention.

BACKGROUND AND SUMMARY

The reduction-oxidation (redox) flow battery is an electrochemical storage device that stores energy in a chemical form and converts the stored chemical energy to an electrical form via spontaneous reverse redox reactions. The reaction in a flow battery is reversible, so conversely, the dispensed chemical energy may be restored by the application of an electrical current inducing the reversed redox reactions. A single redox flow battery cell generally includes a negative electrode, a membrane barrier, a positive electrode and electrolytes containing electro-active materials. Multiple cells may be combined in series or parallel to create a higher voltage or current in a flow battery.

Electrolytes are typically stored in external tanks and are pumped through both sides of the battery. When a charge current is applied, electrolytes lose electron(s) at the positive electrode and gain electron(s) at the negative electrode. The membrane barrier separates the positive electrolyte and negative electrolyte from mixing while allowing ionic conductance. When a discharge current is applied, the reverse redox reactions happen on the electrodes. The electrical potential difference across the battery is maintained by chemical redox reactions within the electrolytes and may induce a current through a conductor while the reactions are sustained. During charge, the electrolytes may be restored to their initial composition for discharge. The amount of energy stored by a redox battery is limited by the amount of electro-active material available in electrolytes for discharge, depending on the total electrolytes volume and the solubility of the electro-active materials.

Hybrid flow batteries are distinguished by the deposit of one or more of the electro-active materials as a solid layer on an electrode. Hybrid batteries may, for instance, include a chemical that forms a solid precipitate plate on a substrate at some point throughout the charge reaction and may be dissolved by the electrolyte throughout discharge. During charge, the chemical may solidify on the surface of a substrate forming a plate near the electrode surface. Regularly this solidified compound is metallic. In hybrid battery systems, the energy stored by the redox battery may be limited by the amount of metal plated during charge and may accordingly be determined by the efficiency of the plating system as well as the available volume and surface area for plating.

One example of a hybrid redox flow battery uses iron as an electrolyte for reactions wherein on the positive electrode each of two Fe2+ ions each loses an electron to form Fe3+ during charge, while each of two Fe3+ ions gains an electron to form Fe2+ during discharge. On the negative electrode, Fe2+ ions receive two electrons and deposit as iron metal during charge, while iron metal loses two electrons and re-dissolves as Fe2+ during discharge:

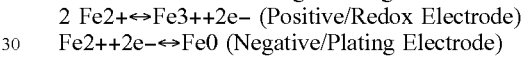

2 Fe2+↔Fe3++2e− (Positive/Redox Electrode)
Fe2++2e−↔Fe0 (Negative/Plating Electrode)

However, when multiple flow cells are used in parallel, the cells must be hydraulically connected through an electrolyte circulation path. This can be problematic, because these electrolytes are electrically conductive and therefore shunt current can flow through the electrolyte circulation path cells driven by cell-to-cell voltage differences, causing energy losses and imbalances in the individual charge states of the cells.

The inventors herein have devised systems and methods to address these issues. In one example, a system for a flow cell for a flow battery, comprising: a first flow field; and a polymeric frame, comprising: a top face; a bottom face, opposite the top face; a first side; a second side, opposite the first side; a first electrolyte inlet located on the top face and the first side of the polymeric frame; a first electrolyte outlet located on the top face and the second side of the polymeric frame; a first electrolyte inlet flow path located within the polymeric frame and coupled to the first electrolyte inlet; and a first electrolyte outlet flow path located within the polymeric frame and coupled to the first electrolyte outlet. In this way, shunt currents may be minimized by increasing the length and/or reducing the cross-sectional area of the electrolyte inlet and electrolyte outlet flow paths.

In another example a system for a flow cell stack for a flow battery, comprising: two or more electrolyte inlet feeds; two or more electrolyte outlet feeds; and two or more flow cells, each flow cell comprising: a first flow field plate; a second flow field plate; and a polymeric frame, comprising: a top face; a bottom face; a first side; a second side, opposite the first side; a first electrolyte inlet located on the top face and the first side of the polymeric frame; a first electrolyte outlet located on the top face and the second side of the polymeric frame; a first electrolyte inlet flow path located within the polymeric frame and coupled to the first electrolyte inlet; a first electrolyte outlet flow path located within the polymeric frame and coupled to the first electrolyte outlet; a second electrolyte inlet located on the bottom face and the first side of the polymeric frame; a second electrolyte outlet located on the bottom face and the second side of the polymeric frame; a second electrolyte inlet flow path located within the polymeric frame and coupled to the first electrolyte inlet; and a second electrolyte outlet flow path located within the polymeric frame and coupled to the first electrolyte outlet. In this way, the electrolyte inlets and outlets may be separated for each flow cell, thereby managing voltage differences between cells, decreasing shunt current between cells, and increasing the performance of the battery.

In yet another example, a system for an all-iron hybrid flow battery, comprising: a redox electrolyte tank including a redox electrolyte; a plating electrolyte tank including a plating electrolyte; and a power module coupled to the redox electrolyte tank via a first pump and further couple to the plating electrolyte tank via a second pump, the power module comprising an internally manifolded flow cell stack the internally manifolded flow cell stack comprising: two or more electrolyte feeds connected to the redox electrolyte tank and/or the plating electrolyte tank; a first sub-stack comprising at least a first flow cells coupled to a first electrolyte feed; and a second sub-stack comprising at least a second flow cells coupled to a second electrolyte feed. In this way, flow cells with similar voltages may be coupled together within a sub-stack, and shunting losses may be minimized by using separate inlet and outlet ports for each sub-stack.

The above advantages and other advantages, and features of the present description will be readily apparent from the following Detailed Description when taken alone or in connection with the accompanying drawings.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIG. 2 schematically depicts a cross-section of the battery depicted in FIG. 1.

FIG. 5A schematically depicts a redox plate-electrode assembly in accordance with the current disclosure.

FIG. 5B shows an example embodiment of a redox plate in accordance with the current disclosure.

FIGS. 3A, 3B, 3C, 3D, 4A, 4B, 4C, 5B, 6A, 6B, 6C, 7A, 7B, and 8A are drawn to scale, but it should be understood that other dimensions may be used without departing from the scope of this disclosure.

DETAILED SPECIFICATION

Figure 1:
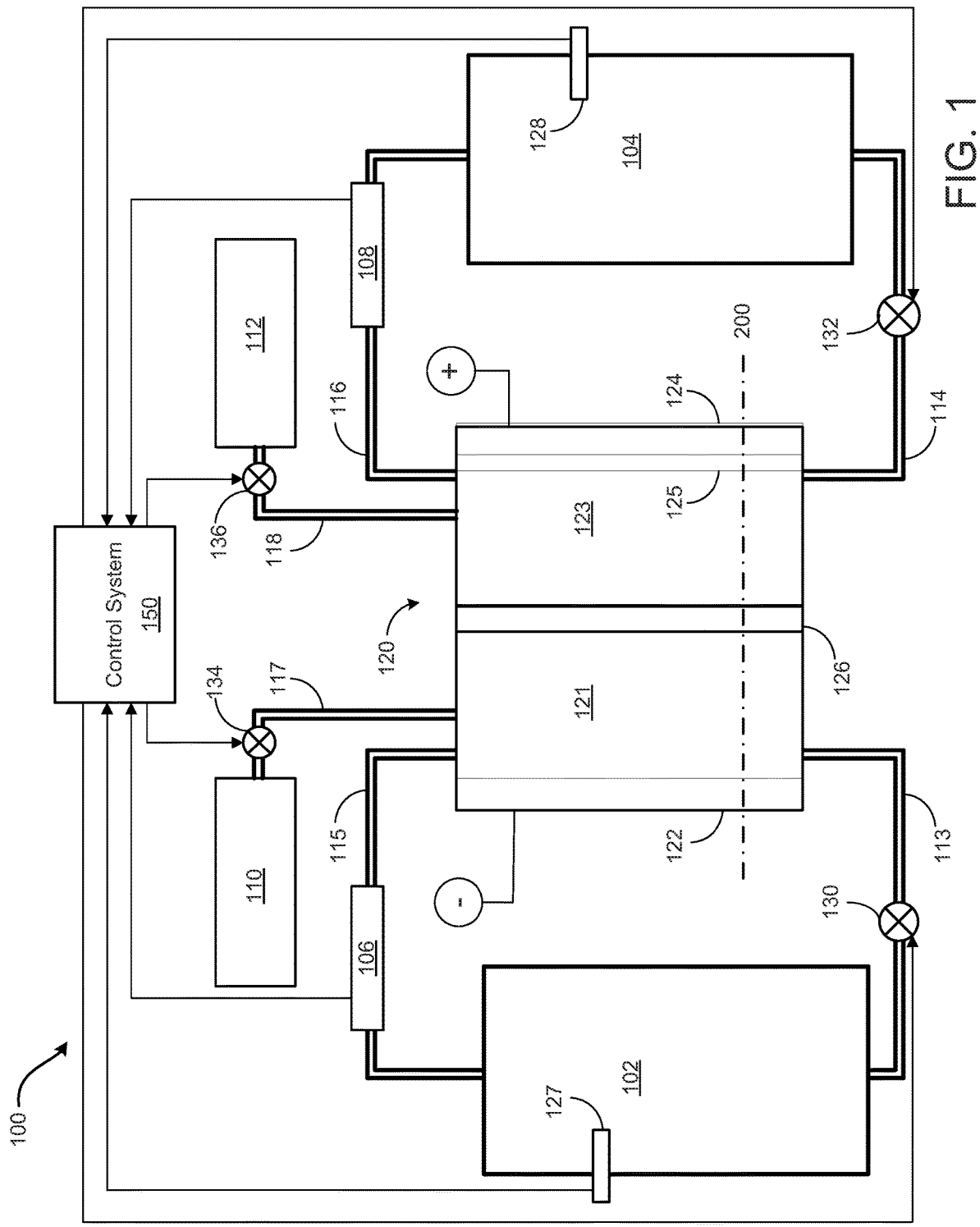
FIG. 1 schematically depicts an example embodiment of a hybrid flow battery system in accordance with the current disclosure.
Figure 6A:
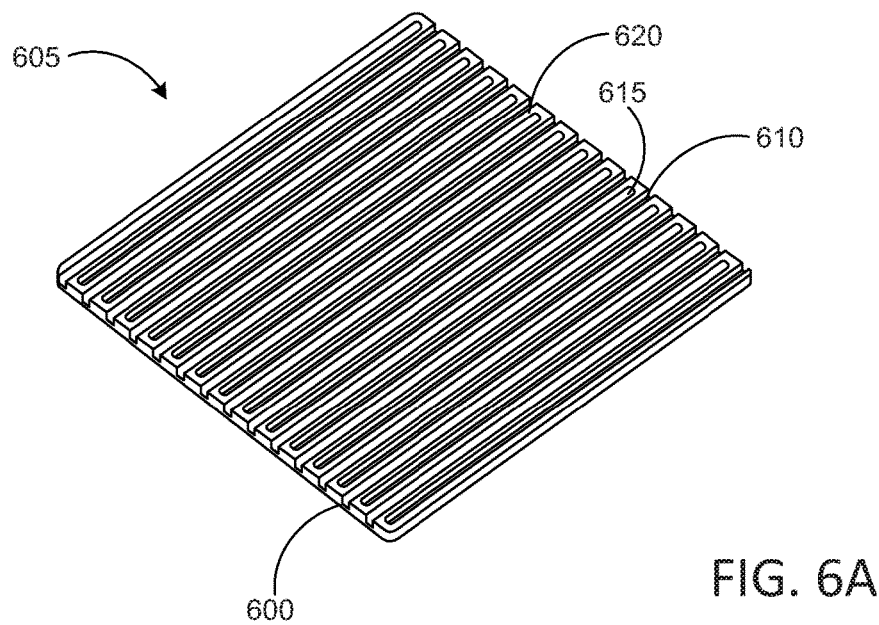
FIG. 6A shows an additional embodiment of a redox plate in accordance with the current disclosure.
Figure 6B:
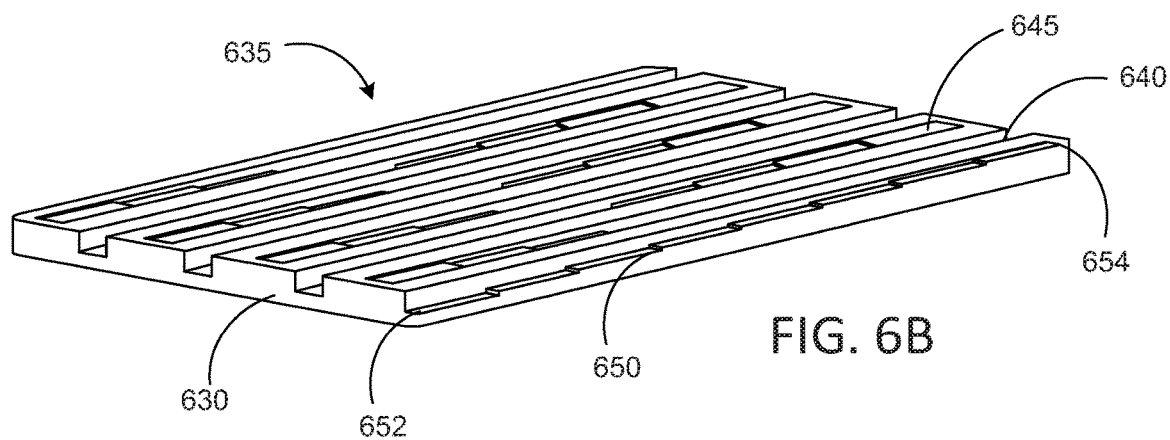
FIG. 6B shows an additional embodiment of a redox plate in accordance with the current disclosure.
Figure 6C:
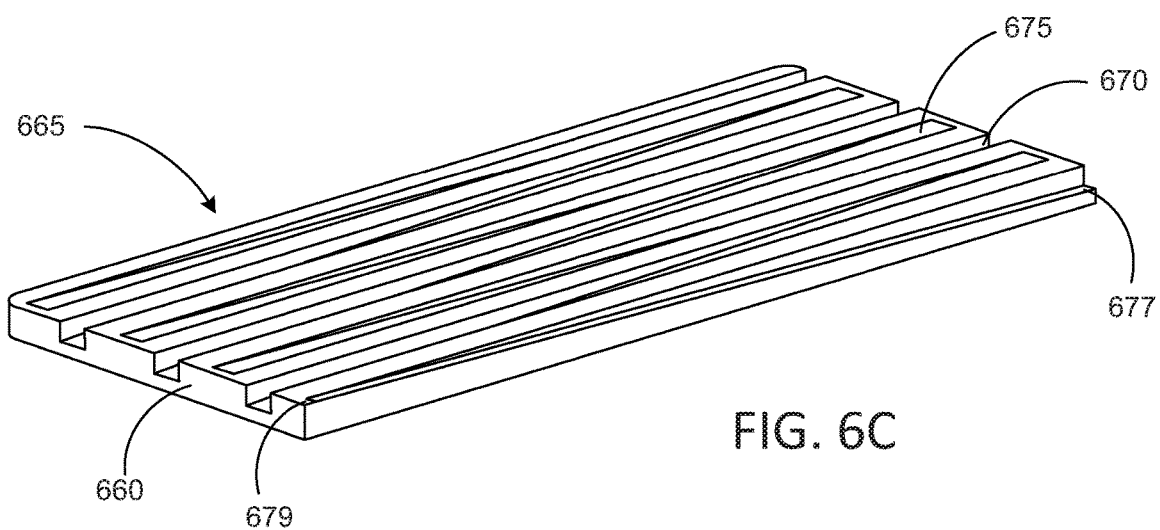
FIG. 6C shows an additional embodiment of a redox plate in accordance with the current disclosure.
Figure 7A:
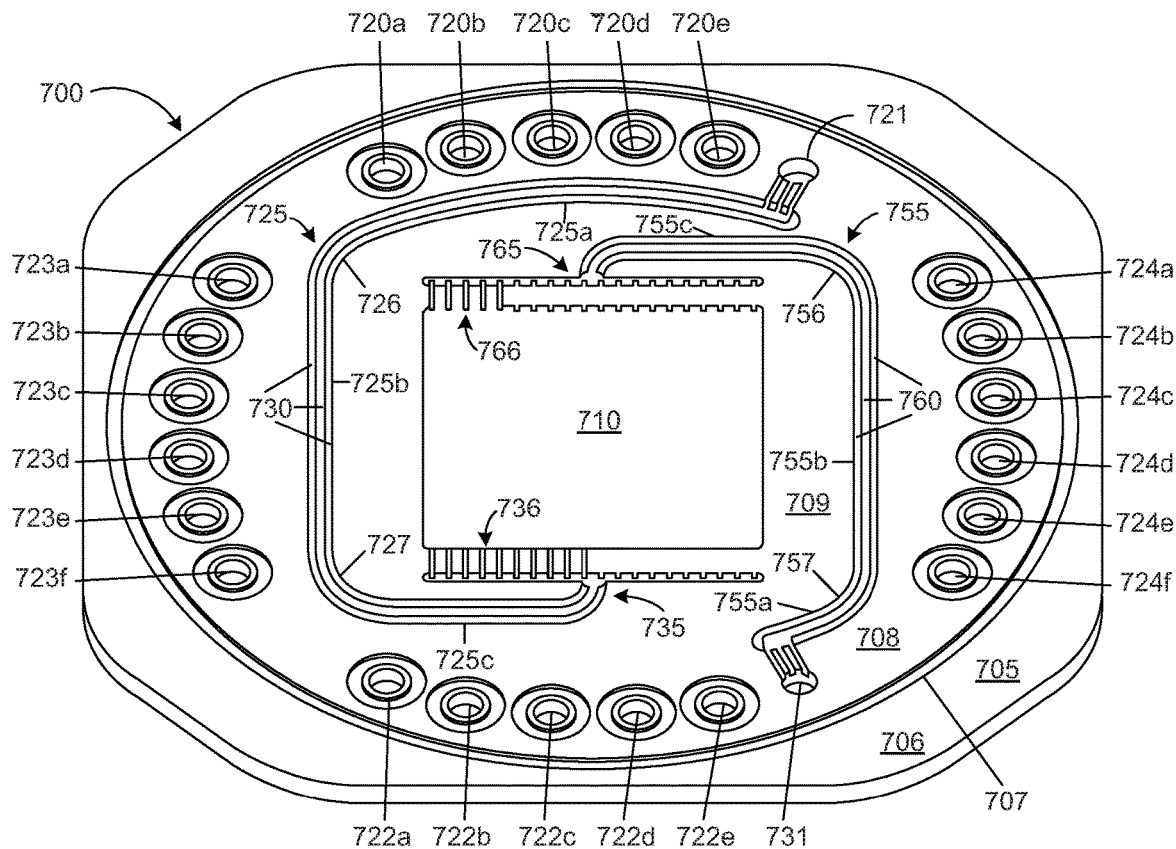
FIG. 7A shows, in schematic detail, an embodiment of a single flow cell in accordance with the current disclosure.
Figure 7B:
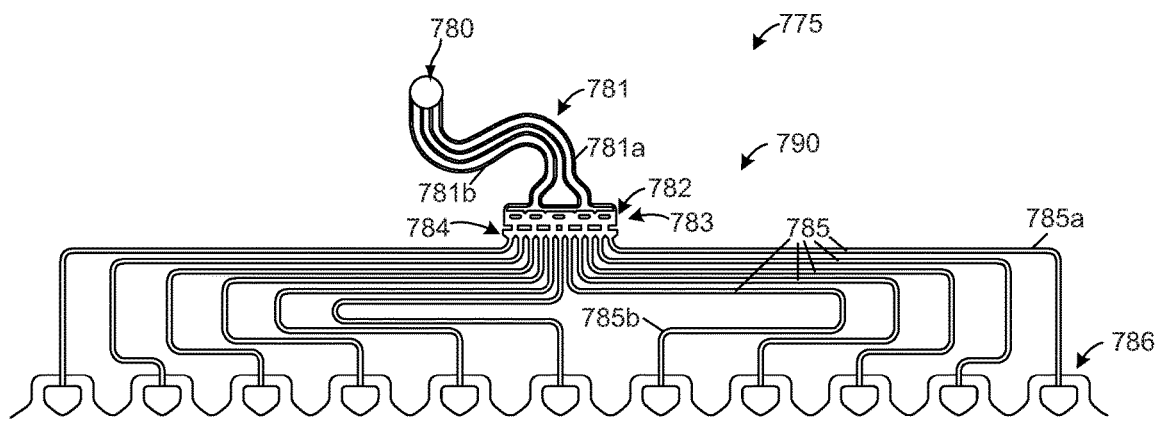
FIG. 7B shows, in schematic detail, a close-up view of a portion of the flow cell of FIG. 7A.

The following description relates to systems for an all-iron hybrid flow battery (IFB), such as the IFB schematically depicted in FIG. 1. The IFB may include redox and plating electrodes, membrane barriers, and redox and plating plates, as diagrammed in FIG. 2. The plating electrode may comprise a folded fin design, as shown in FIGS. 3A, 3B, 3C, 3D, 4A, 4B, and 4C. The plating electrode fins may comprise perforations, as shown in FIGS. 4A and 4C. The redox plate may include a robust polymer plate as well as C/Graphite composite inserts, as shown in FIGS. 5A and 5B. The redox and plating plates may further comprise interdigitated flow fields as shown in FIG. 6A. The flow channels may be stepped as shown in FIG. 6B, or sloped as shown in FIG. 6C. The redox and plating plates may be included in an internally manifold flow cell, as shown in FIGS. 7A and 7B. A plurality of flow cells may be assembled into a flow cell stack, as shown in FIG. 8A. The flow cell of FIG. 7A and the flow cell stack of FIG. 8A may facilitate an electrolyte flow pattern that reduces shunt current losses, such as the flow pattern depicted in FIG. 8B.

FIG. 1 shows a schematic diagram of an example embodiment of an all-iron hybrid flow battery (IFB) 100 in accordance with the present disclosure. While not depicted herein, other flow battery configurations may be used without departing from the scope of this disclosure.

IFB 100 comprises a plating electrolyte tank 102, a redox electrolyte tank 104, and one or more flow cells 120. Plating electrolyte tank 102 may include a plating electrolyte stored within, and redox electrolyte tank 104 may include a redox electrolyte stored within. The plating electrolyte and redox electrolyte may be suitable salts dissolved in water, such as $FeCl_2$ or $FeCl_3$ (or $FeSO_4$ or $Fe_2(SO_4)_3$) and other supporting electrolytes. The plating electrolyte and redox electrolyte may include the same salt at different molar concentrations.

Flow cell 120 may include negative reactor 121 and positive reactor 123. Negative reactor 121 may be fluidly coupled to plating electrolyte tank 102 via conduits 113 and 115. Similarly, positive reactor 123 may be fluidly coupled to redox electrolyte tank 104 via conduits 114 and 116. Negative reactor 121 may include plating electrode 122. Positive reactor 123 may include redox plate 124 and redox electrode 125. Negative reactor 121 and positive reactor 123 may be separated by barrier 126. Barrier 126 may embodied as a membrane barrier, such as an ion exchange membrane or a microporous membrane, placed between the plating electrolyte and redox electrolyte to prevent electrolyte crossover and provide ionic conductivity.

Components of flow cell 120 are described in further detail herein, and with regards to FIGS. 2-7. Cross section 200 of flow cell 120 is described herein and shown in FIG. 2.

Plating electrolyte may be accelerated from plating electrolyte tank 102 into fluid cell 120 via conduit 113 through the use of pump 130. Plating electrolyte may then flow back to plating electrolyte tank 102 via conduit 115. Similarly, redox electrolyte may be accelerated from redox electrolyte tank 104 into fluid cell 120 via conduit 114 through the use of pump 132. Redox electrolyte may then flow back to redox electrolyte tank 104 via conduit 116.

IFB 100 may also include negative side additive tank 110 and/or positive side additive tank 112. Additive tanks 110 and 112 may include an acid additive. Negative side additive tank 110 and positive side additive tank 112 may include different acid additives contained therein, or may include the same acid additive at different concentrations or pH values. Negative side additive tank 110 may be fluidly coupled to negative reactor 121 via conduit 117. In some embodiments, negative side additive tank 110 may be fluidly coupled to plating electrolyte tank 102. Similarly, positive side additive tank 112 may be fluidly coupled to positive reactor 123 via conduit 118, or may be fluidly coupled to redox electrolyte tank 104. The negative additive may be accelerated into the negative reactor 121 by negative additive pump 134. The positive side additive may be accelerated into positive reactor 123 by positive additive pump 136.

Pumps 130, 132, 134, and 136 may be controlled at least partially by a control system 150. Control system 150 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described below as well as other variants that are anticipated but not specifically listed.

Control system 150 may be configured to receive information from a plurality of sensors, such as sensors 106 and 108, and probes 127 and 128, and further configured to send control signals to the pumps described herein, and/or other actuators within IFB 100, such as one or more valves. Control system 150 may receive input data from the various sensors, process the input data, and trigger the pumps and/or other actuators in response to the processed input data based on instruction or code programmed therein corresponding to one or more routines.

Probe 127 may be disposed within, or otherwise coupled to plating electrolyte tank 102 in a manner that allows probe 127 to contact the plating electrolyte stored within plating electrolyte tank 102. Similarly, probe 128 may be disposed within, or otherwise coupled to redox electrolyte tank 104 in a manner that allows probe 128 to contact the redox electrolyte stored within redox electrolyte tank 102. Probes 127 and 128 may be used to determine and monitor the chemical properties of the electrolytes stored in tanks 102 and 104, respectively.

Sensors 106 and 108 may be disposed within or otherwise coupled to conduits 115 and 116, respectively, in a manner that allows the sensors to contact electrolyte returning from flow cell 120 to electrolyte tanks 102 and 104. Sensors 106 and 108 may determine or monitor chemical properties (such as concentration, potential, and pH) of electrolyte passing through conduit 115 and 116, respectively. In some embodiments, sensors 106 and 108 may be optical sensors configured to allow flow through of electrolyte.

Some embodiments of IFB 100 may have a plating electrolyte probe, plating electrolyte sensor, redox electrolyte probe, redox electrolyte sensor, or some combination thereof. Probes may also be placed inside the reacting portion of IFB 100 in negative reactor 121 and positive reactor 123.

Data collected from probes 127 and 128, from sensors 106 and 108, and from other sensors disposed within IFB 100 may be used by control system 150 to control pumps 130, 132, 134, and 136. For example, the flow rate of electrolyte through flow cell 120 may be increased by increasing the speed of pump 130 and/or pump 132. The pH of electrolyte in flow cell 120 and/or electrolyte tanks 102 and 104 may be altered by actuating pump 134 and/or pump 136. Pumps 130 and 132 may be actuated by control system 150 using different control routines. Similarly, pumps 134 and 136 may be actuated by control system 150 using different control routines.

Flow cell 120 may be included in a power module (not shown) which may be connected to a power source, such as a power grid or a renewable power source. The power source may be used to charge the power module and/or to store electrical energy in the electrolytes. Pumps 130, 132, 134, and 136 may be connected to the power module and/or the power source. The power module may be discharged through electrical loads, thus releasing electrical energy stored in the electrolytes.

FIG. 2 shows a schematic diagram of a portion of cross-section 200 of the example IFB 100 as described herein and depicted in FIG. 1. As described with regard to FIG. 1, IFB 100 may include a plurality of flow cells. The flow cells may be aligned in parallel. Cross section 200 shows a first flow cell 201 stacked in parallel with a second flow cell 251. Only a portion of second flow cell 251 is shown for simplicity. It should be understood that multiple parallel flow cells may be appended to the diagram shown in FIG. 2 to form the flow cell battery of the IFB.

Flow cell 201 may comprise redox plate 205, redox electrode 210, barrier 220, and plating electrode 230. As shown in FIG. 2, redox plate 205, redox electrode 210, barrier 220, and plating electrode 230 may be stacked in this order, from the positive electrode to the negative electrode. Flow cell 251 may be stacked in parallel with flow cell 201, such that plating electrode 230 is placed adjacent to redox plate 255 of flow cell 251. In the example shown in FIG. 2, plating electrode 230 and redox plate 255 share a face. In some examples, a plating plate or other barrier may be placed between the plating electrode of one flow cell and the redox plate of the adjacent flow cell. An example of this embodiment is described herein and with regards to FIGS. 4A-C.

Redox plates 205 and 255 may comprise a set of channels 207 and 257, respectively. Channels 207 and 257 may facilitate the flow of electrolyte through the flow cell. Redox plates 205 and 255 may be made of a suitable conductive material, such as carbon, graphite or titanium. As discussed further herein, and with reference to FIG. 6A, the redox plates may be formed of multiple materials, including non-conductive materials such as plastic in addition to the conductive material.

Redox electrode 210 may be made of a suitable conductive material such as carbon, graphite, or titanium. Redox electrode 210 may be a high-surface electrode, allowing for a relatively large surface-to-volume ratio, and thus a relatively large reaction area. The ferrous/ferric redox reaction may occur on the surface of redox electrode 210.

In embodiments where the redox electrode is made from a carbon material, the carbon material may be electrochemically oxidized to further increase its surface area. The electrochemical oxidizing treatment may range from 500 C/g to 5000 C/g depending on the application and the nature of the carbon material. This may have the effect of enhancing the activity of the electrode due to the increase in surface area, the increase in O to C molar ratio, as well as the increase in —COOH functional groups on the surface. This electrode may be coupled with a set of electrolyte distribution channels to ensure the electrolyte is administered to the electrode properly. This channel geometry may be selected to ensure the pressure drop is minimized, while maximizing the forced convection through the electrode and minimizing the electrical resistances.

Plating electrode 230 may be made from a suitable substrate material on which Fe0 may deposit and solidify during charging. The plating electrode may use a porous fin structure in order to increase plating kinetics and performance. Examples of plating electrode structure are described herein, and with reference to FIGS. 3A-3D and 4A-4C. Overpotential on the negative electrode side of flow cell 201 may be decreased by increasing the plating electrode surface area. Further, the performance of the plating electrode may be increased by reducing the plate thickness and fin height, and thus reducing ohmic losses. Pore size of the plating electrode may be selected to be large enough to prevent blockages from solidified Fe0 during charging. For example, the pore size may be between 0.01 cm and 1 cm, but may be smaller or larger, depending on the storage capacity requirement of the battery. It may be advantageous to reduce the shared surface area of the redox electrode of the flow cell with the plating electrode of the flow cell through the membrane barrier. Plating capacity losses, as a result of ferric ions crossing over from the redox side and reacting with iron on the plating side may be minimized by allowing for a relatively large volume of open space within the plating electrode, thus allowing for a high plating density (mAh/cm2). The plating material may be made from carbon, iron, iron alloy, stainless steel, titanium, or any suitable material with a carbon, iron, iron alloy, or titanium coating.

Barrier 220 may be a microporous membrane, an ion exchange membrane, or a composite membrane. Barrier 200 may allow for electrical separation of the redox electrode and the plating electrode. The membrane may be made from a material which prevents crossover of the plating and redox electrolytes, and thus low battery coulombic efficiency loss. The membrane may be made from a material which also provides a high ionic conductivity, and thus low battery performance loss due to membrane resistivity.

Furthermore, to minimize iron corrosion reaction, a pH between 3 and 4 is desired for the iron plating reaction on the negative side, whereas to promote redox reaction kinetics, a pH less than 1 is desired for the ferrous and ferric ion redox reaction on the positive side. Thus, the membrane may be made from a material which also has a low proton crossover rate, and that has a high chemical and mechanical stability.

As such, the membrane used in the IFB battery of the current disclosure may be a microporous membrane that includes a single layer polyolefin separator (e.g. PP, PE, Polymethylpentene, or similar), laminates of at least two layers of polyolefins, a cation or anion exchange membrane, or laminates of microporous polyolefin layers and ion exchange membranes. The microporous polyolefin layers may be further coated or modified to improve lamination, ion exchange properties, or stability. The laminates may be created with pores large enough to accommodate anion or cation specific resins, beads, or gels to enhance the performance of the membrane.

Figure 3A:
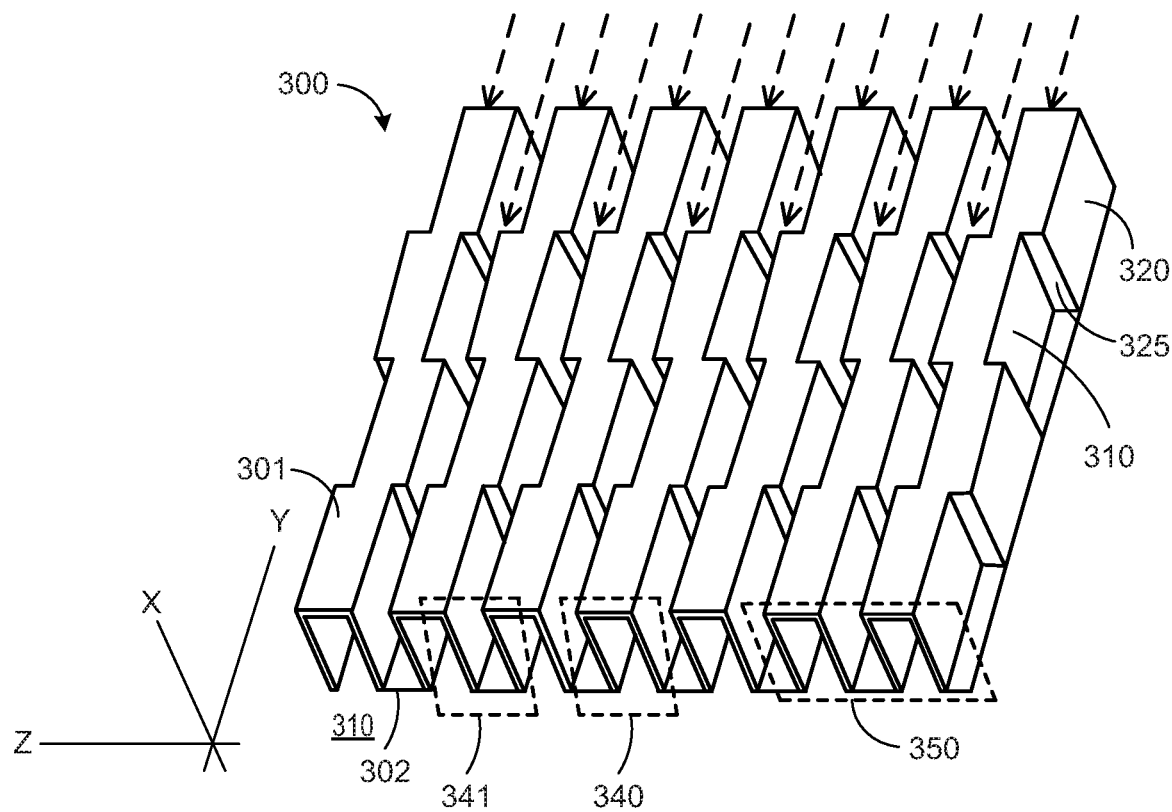
FIG. 3A depicts an example embodiment of a plating electrode in accordance with the current disclosure.

FIG. 3A shows one example fin structure 300 for a plating electrode in accordance with the current disclosure. Fin structure 300 comprises a folded, lanced offset (or serrated) fin structure. In the example depicted in FIG. 3A, the electrode face is arranged parallel to the membrane barrier (y-z plane) and is immediately adjacent to the plating electrolyte in the plating side of the cell, as shown in FIG. 2. The electrode plate may be plicate such that the cross section of the plate in the x-z plane may follow a sinusoidal curve. The cross section (350, see FIG. 3B) of this embodiment is sinusoidally square. As such, a first plane 301 is closer to the membrane than a second plane 302 that is further from the membrane. In this example, both first and second planes are parallel to the membrane.

Linear ridges 320 may run along the surface of the first plane in the y-direction at set intervals dividing the plane into strips along the y-axis. Alternating strips may be depressed into the second plane so that two strips may have a congruent edge in the y-z plane but some amount of separation in the x-plane. The separation may be bridged by a crossing ridge 325 connecting the consecutive parallel plate strips at right angles. The fin structure 300 may thus offer increased surface area extending along the depth of the oscillations.

The ridges may thus form serrations in the z-direction, further increasing the plate's surface area and allowing electrolyte to flow through the fin spacers. A first plane strip and its two adjacent ridges may define a fin 340. The second plane strip, separating adjacent fins, may be defined by a plate separator or a fin spacer 341. The fin serrations may be aligned along the z-axis such that they are in phase with the adjacent fins. In other words, the fin offset in the z-direction may occur at the same y-location, be in the same direction, and be offset by the same amount for successive fins.

Fin structure 300 thus has an electrode surface area that extends in three orthogonal vector directions. The 3-dimensional surface area configuration may increase the surface area without increasing the active area of the flow battery. The plating electrode material may also be porous such that depressions or holes run through or into the plate. In other disclosed embodiments, the plate may be arranged so that it is rotated about the x-axis by 90 degrees such that the ridges run along the z-direction. Electrolyte may thus flow in the y-direction, as indicated in FIG. 3 by dashed arrows, or in the z-direction.

Figure 3B:
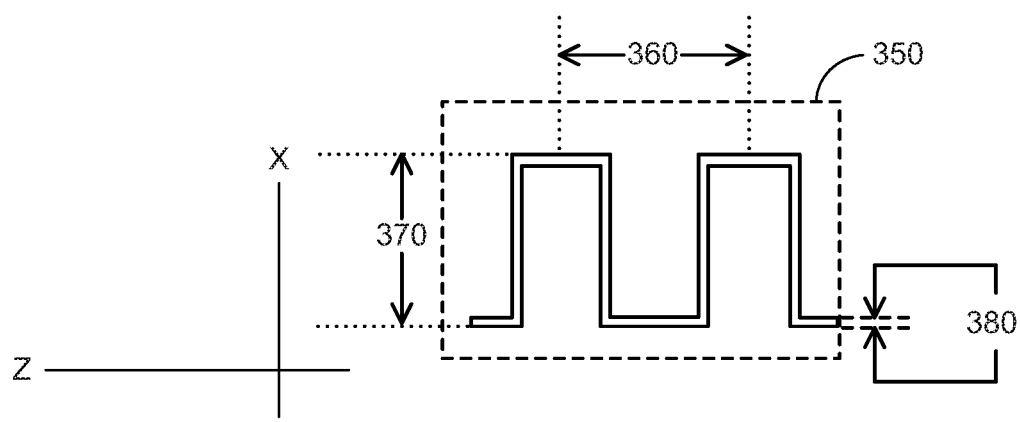
FIG. 3B depicts a cross section of the plating electrode depicted in FIG. 3A.

The sinusoidally square cross section 350 in the x-z plane depicted in FIG. 3 is shown in greater detail in FIG. 3B. Other embodiments may have sinusoidally triangular or purely sinusoidal cross sections. The cross section may be defined by a pitch 360, a height 370 and a thickness 380. As shown, pitch 360 is a half wavelength of the sinusoidal cross section. Height 370 represents the distance between first plane 301 and second plane 302. In other words, height 370 represents the depth of the depressed surface, or the depth of the plating electrode. Height 370 may be optimized to minimize the plating electrode ohmic resistance loss. Thickness 380 represents the distance from the face adjacent to the electrolyte to the face opposite the electrolyte. Thickness 380 may be set to the value of the thinnest material allowable, in order to minimize material costs, and to minimize the amount of space used by the plate, thus allowing for more active surface area and plating volume. However, embodiments using iron or an iron alloy as the plating electrode material may use a thicker electrode in order to increase the plate durability to abate ferric ion attacks on the metal iron surface. In some embodiments, including those where the plating electrode is made from iron or an iron alloy, it may be desirable to coat the surface of the electrode near the membrane interface with a non-conductive material such as fluoroelastomers (FKM) or perfluourinated elastomers (FFKM) to reduce the ferric ion attack on plated Fe0 from redox side crossover.

Other variations on the disclosed plating electrode may have alternate plicate fin configurations including a herringbone fin, a serrated fin with a triangular profile (narrower on the top and wider on the bottom), a louvered fin, and/or a wavy fin.

Figure 3C:
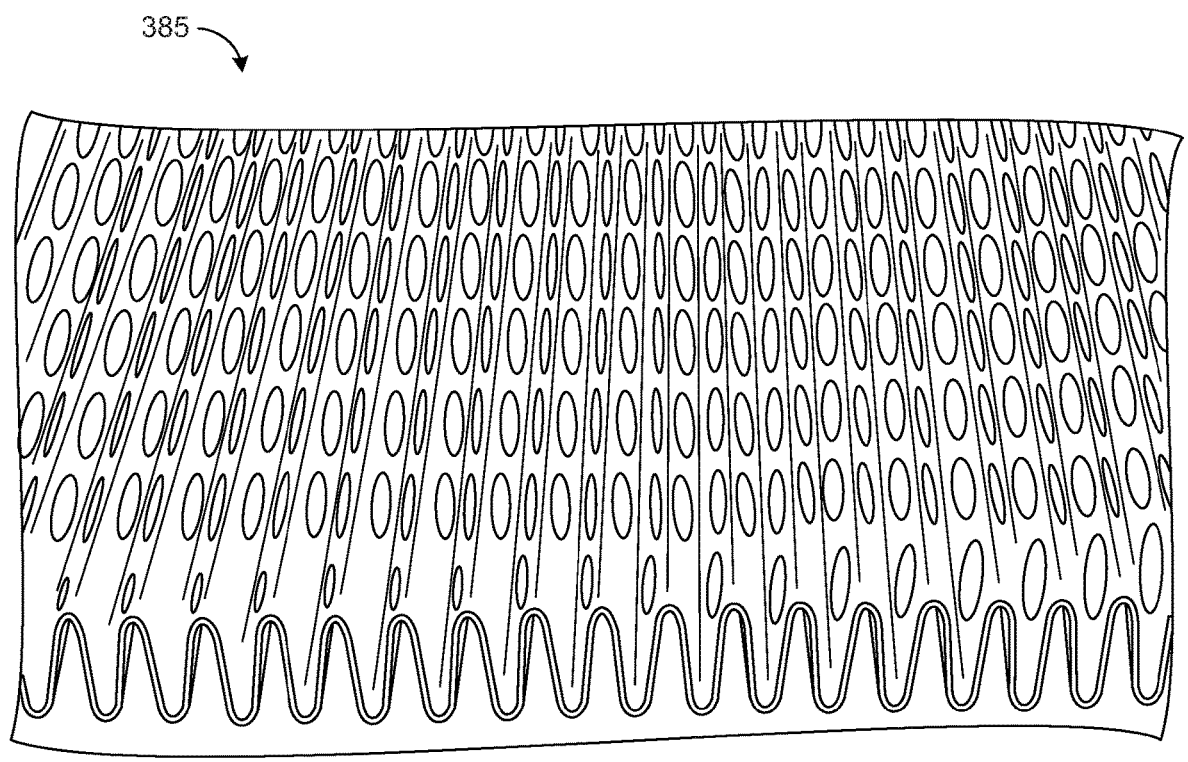
FIG. 3C depicts an alternative embodiment of a plating electrode in accordance with the current disclosure.
Figure 4A:
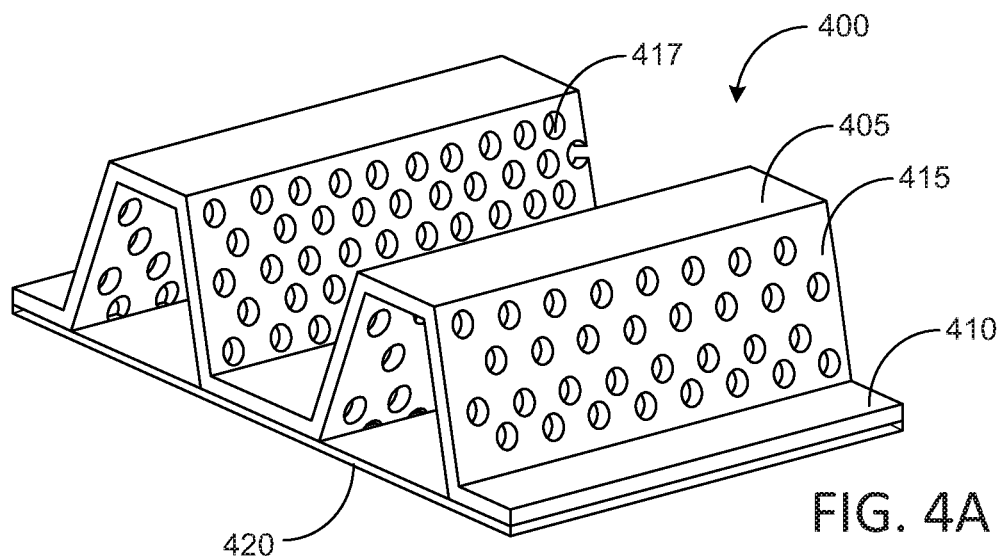
FIG. 4A depicts an additional embodiment of a plating electrode in accordance with the current disclosure.

FIG. 3C depicts an alternative embodiment of a plating electrode in accordance with the current disclosure. Plating electrode 385 comprises a louvered fin design that may comprise one of the cross sectional patterns described above with respect to fin structure 300, further including angled notches protruding from, and along the length of, the ridges. The ridges may be sharp (formed by the intersection of two linear surfaces). The ridges may also be curved and have an arched downward concavity in the negative x-direction as viewed from the y-z plane alternating with arched upward concavity in the upward x-direction with maximums at the first plane and minimums in the second plane.

Figure 3D:
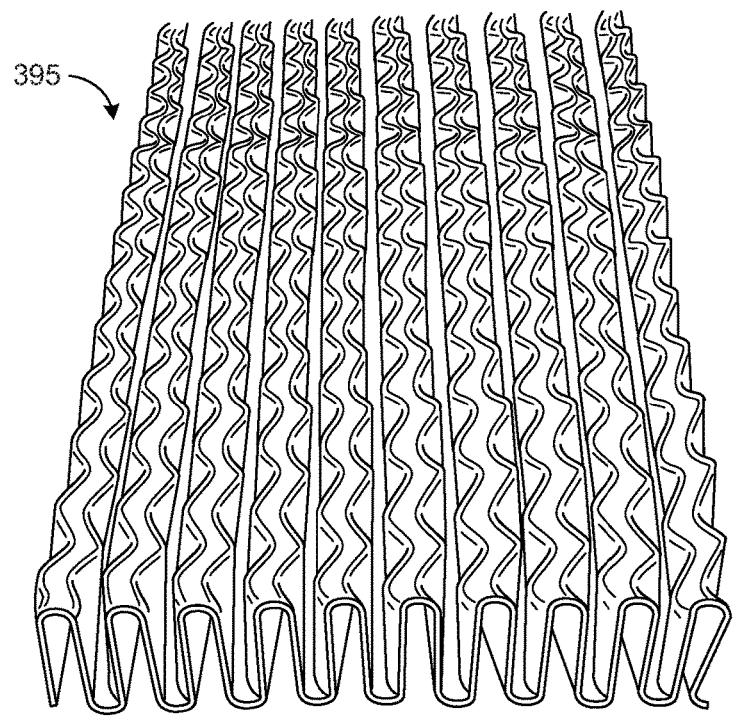
FIG. 3D depicts an alternative embodiment of a plating electrode in accordance with the current disclosure.

FIG. 3D depicts an alternative embodiment of a plating electrode in accordance with the current disclosure. Plating electrode 395 comprises a wavy plicate fin which may comprise a cross-section with a sinusoidal pattern similar to the pattern shown in FIG. 3B. In this embodiment, the ridges running along the surface of the first plane in a y-direction may be separated by an interval dividing the plane into strips along the y-axis. Alternating strips may then be depressed into the second plane so that two strips may have a congruent edge in the y-z plane but be some distance apart in the x plane, which may be traversed by a ridge connecting the consecutive parallel plates at right angles. In this embodiment, the fins are displaced sinusoidally in the z-direction. Similar to the previously mentioned embodiments, this configuration allows the electrode surface area a third dimension for expansion so that surface area may be increased without affecting the active area of the cell.

FIG. 4A shows another example fin structure 400 for a plating electrode in accordance with the current disclosure. Fin structure 400 comprises a folded, perforated fin structure. In the example depicted in FIG. 4A, the electrode face is arranged parallel to the membrane barrier and is immediately adjacent to the plating electrolyte in the plating side of the cell, as shown in FIG. 2. The electrode plate may be plicate such that the cross section of the plate in the x-z plane may follow a sinusoidal curve. The cross section (430, see FIG. 4B) of this embodiment is sinusoidally trapezoidal. As such, a first plate 405 is closer to the membrane than a second plate 410 that is further from the membrane. In this example, both first and second plates are parallel to the membrane and divided into parallel strips. In this example, the side plates 415 are angled such that strips of second plate 410 have a greater surface area than strips of first plate 405, but it should be understood that other configurations are possible without departing from the scope of this disclosure. The fins may be constructed out of carbon, iron, iron alloy, stainless steels, or titanium or other base materials and may be coated with a material such as iron or iron alloy.

Additionally, these fins may also include perforations 417, such as through holes, on all surfaces to increase the surface area plating density. The perforations are not limited to side plates 415, and in some embodiments perforations may also be included on first plates 405 and second plates 410. In some cases it might be advantageous to add perforations to the top plates 405 to reduce the ionic length of fin structure 400. Additionally, these fins may also include perforations 417 on all surfaces to increase the surface area plating density.

Figure 4B:
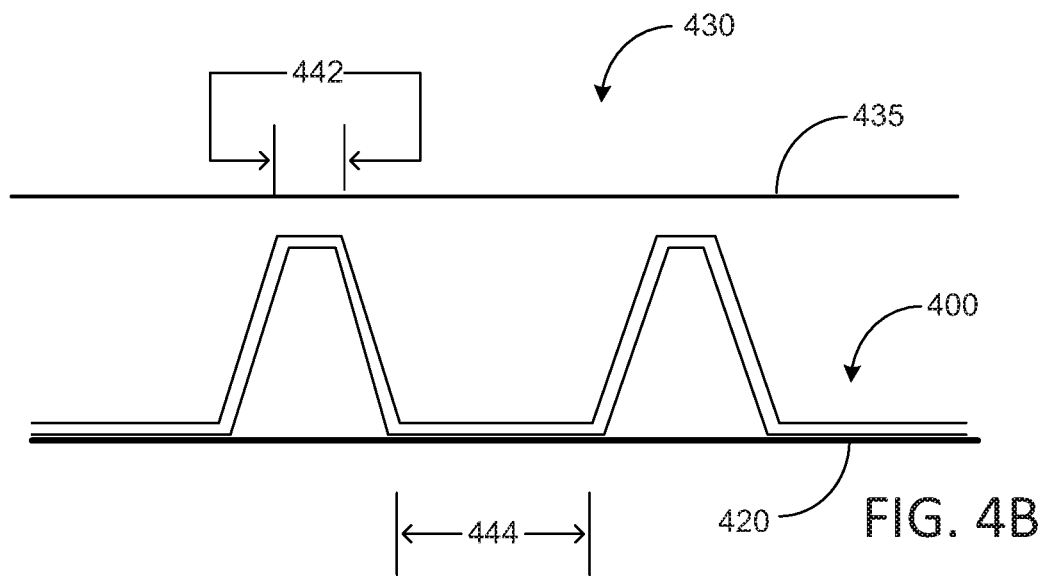
FIG. 4B depicts a cross section of the plating electrode depicted in FIG. 4A.
Figure 4C:
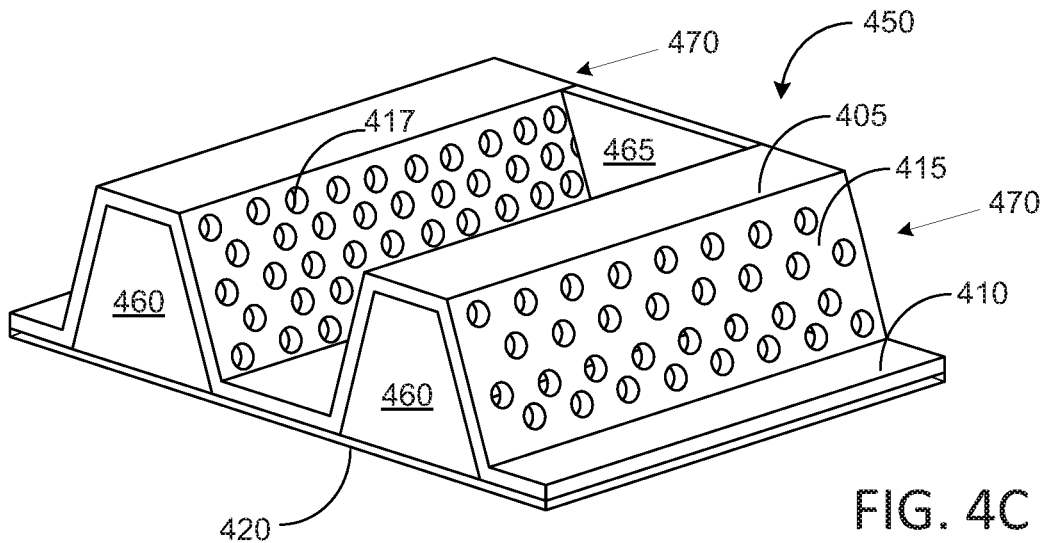
FIG. 4C depicts an additional alternate embodiment of a plating electrode in accordance with the current disclosure.

Other embodiments may have straight linear ridges along the y-or-z direction dividing the parallel plates into strips; however, they may share a ridge axis when viewed from the x-direction. In other words, as shown in FIG. 4B, the width of the strips of first plate 405 is less than the separation between adjacent strips in second plate 410. In this configuration, side plates 415 adjoining the top and bottom plate strips form an obtuse concave upward angle with the second plane and an obtuse concave downward angle with the first plane.

The fins may also be attached to base plate 420. Base plate 420 may be embodied as a current collector, bipolar plate, etc. and may run along, and adhere to, strips of second plate 410. Base plate 420 may be located immediately adjacent to the plate in the battery and be nearest the back of the redox plate of an adjacent flow battery. The base plate may be made from carbon, iron, iron alloy, stainless steel, titanium or any suitable material with a carbon, iron, iron alloy or titanium coating.

The number of fins per inch, or pitch, is defined as the peak-to-peak distance and defines the density of fins in the electrode. Generally, a larger pitch increases the surface area of the electrode and adds support to the substrate. If the pitch is too small, the membrane/separator has the potential to sag between the fins. However, the maximum pitch fabricated depends on the tooling available.

FIG. 4B depicts a cross-sectional view 430 of fin structure 400 in conjunction with membrane barrier 435. As shown in FIG. 4B, the width of each strip of first plate 405 is indicated at 442, the width of each strip of second plate 410 is indicated at 444. The strips of first plate 405 are closer to membrane barrier 435 than are the strips of second plate 410. The ratio of 442 to 444 may, for example, vary from 0.0 to 1.0. The ratio may be determined with regard to its proximity from membrane barrier 435, as ohmic resistance is lower closer to the membrane. Losses may therefore be minimized by embodiments with higher 442 to 444 ratios because more Fe0 may deposit closer to membrane barrier 435 where the ohmic resistance may be lower, as opposed to further away from the membrane where ohmic resistance may be higher.

If width 442 is greater than width 444, the two plates closer to the membrane may connect with the plated metal during the plating operation, degrading the battery. If this occurs, the ionic path could be cut off causing a high ohmic resistance. Therefore, disclosed embodiments may have a value for width 442 that is smaller than or equal to a value for width 444. Typically, plating will occur closer to the membrane, so disclosed embodiments may maximize the space available for plating closer to the membrane.

FIG. 4C shows another example fin structure 450 for a plating electrode in accordance with the current disclosure. Fin structure 450 comprises features of fin structure 400, as well as inter-digitation plates 460 and 465. By incorporating inter-digitation plates 460 and 465, fin structure 450 comprises a series of flow channels 470 between the fin and the base plate. Flow channels 470 are open on one end and blocked on the other end. In this way, electrolyte flow may enter one end of the channel, but may not exit the opposing end. The inter-digitation plates may force the plating electrolyte to have a better distribution on the plating side. The interdigitation plates may form dead-ended inlet and outlet flow channels. Similarly, partially interdigitated flow field designs may be used without departing from the scope of this disclosure. Partially interdigitated flow field designs may include constricted inlet and outlet flow channels, as opposed to dead-ended inlet and outlet flow channels.

The redox reaction for ferrous/ferric ions on carbon occurs extremely fast when compared to the plating reaction (approximately 2 orders of magnitude). As such, the redox electrode does not limit battery performance. However, by pumping electrolytes through graphite flow channels, as shown in FIG. 2 for example, a number of unnecessary reactions may occur on the graphite surface of these channels. Eliminating the excess reaction area provided by the graphite surface of the channels on the redox plate may reduce the cost of production without effecting battery performance. Furthermore, it is preferable for redox reaction to occur on the high surface redox electrode material, instead of the flow channel, as the ohmic resistance losses at the redox electrode are much smaller than the ohmic resistance losses at the channel.

FIG. 5A shows a redox plate/electrode assembly 500 in which the flow channels are made from low-cost plastics instead of C/graphite. Redox plate/electrode assembly 500 may comprise redox plate 505, and redox electrode 510. Redox plate 505 may include plastic frame 515, and conductive inserts 520. Plastic frame 515 and conductive inserts 520 may be assembled to form a plurality of flow channels 530 for the conduction of electrolyte through assembly 500.

Redox electrode 510 may share a first face with a barrier such as a microporous membrane or ion exchange membrane (not shown) and a second face with redox plate 550. Redox electrode 510 may be a porous electrode, as described herein.

Plastic frame 515 may be manufactured from a low-cost plastic, such as PVC or Polyolefin. Plastic frame 515 may be constructed separately from conductive inserts 520. Plastic frame 515 may be created via machining, injection molding, or compression molding. Conductive inserts 520 may be manufactured from a material such as carbon, a carbon/graphite composite, or titanium, or other material capable of conducting electrons to and from the ferric/ferrous reaction occurring on the redox electrode 510, and capable of withstanding corrosion from ferric or ferrous ions. Conductive inserts 520 may form flow ribs when adhered to plastic frame 515, thus providing electrical conductivity for electrolyte flowing through channels 530. Conductive inserts 520 may be glued to the plastic frame 515 with epoxy, Viton, or other adhesive material. Other embodiments may use a mechanical lock-in feature to secure the conductive inserts to plastic frame 515. Alternately, plastic frame 515 may be formed using injection molding or compression molding directly onto the conductive inserts. Plastic frame 515 may be secured to conductive inserts 520 by mechanical features such as small holes or groves for liquid plastic to flow into during the molding process which may be incorporated into the conductive inserts.

Multiple channels 530 may flow linearly through the redox plate adjacent to the redox electrode that allow electrolyte to pass through redox side of the IFB. Channels 530 may run parallel or perpendicular to the fins of a disclosed plating electrode. Channels 530 may be direct flow through, serpentine, interdigitated, or partially interdigitated channels. Examples of channel configurations are described further herein and with regards to FIGS. 5B, 6A, 6B, and 6C.

FIG. 5B shows a perspective drawing of a redox plate 550 in accordance with the current disclosure. Plastic frame 555 is similar to plastic frame 515 depicted in FIG. 5A. However, plastic frame 555 may be manufactured as part of a larger plastic manifold plate 560.

Flow channels 565 direct electrolyte flows linearly through redox plate 550. Conductive inserts 570 provide electrical conductivity when in physical contact with a redox porous electrode and a plating electrode of an adjacent cell (not shown). Inserts 570 may each be in the shape of a rectangular prism with a long edge 575 that may be the length of redox plate 550. Multiple inserts 570 may be attached to plastic frame 555 so that they run parallel to an edge and are separated by a distance that is the width of channels 565. The protruding portion of the plate, referred to as flow ribs 580, may form a second edge 585 of a first channel and a first edge 590 of an adjacent second channel. The surface of the plate nearest the redox electrode may therefore be sinusoidally square.

Conductive plates of significant surface area cannot be constructed out of carbon/graphite composite material using injection molding due to the high graphite content, thus the use of plastic plates with C/graphite inserts allow for high volume manufacturing of redox plates. Further, the use of injection molding allows for greater part-to-part consistency and lower tolerance than graphite materials. Additionally, the use of a lower cost plastic plate material may allow for redox plates to be constructed at a much lower cost than their C/graphite composite/Ti counterparts.

Bipolar plates may be used in the redox flow battery to direct and transport electrolytes to the reaction sites and then removed reacted electrochemical species away from the reaction sites. The flow cell design of the current disclosure minimizes the three potential battery performance loss mechanisms by utilizing forced convection of the pumped electrolyte to maximize the electrode active surface area and minimize ohmic resistance. In this way, by utilizing forced convection, fresh electrolyte is ensured to always be on the catalyst surface, the electrode surface is completely utilized, and any product formation is quickly swept away.

Specifically, the inventors of the current disclosure may employ an interdigitated or a partially interdigitated flow field design to the field of redox flow batteries. When a conventional flow field is used, the reactants flow over the surface of the electrode. An interdigitated flow field, which includes dead-ended inlet and outlet channels, forces the incoming reactant to flow through the porous electrode in order to exit. A partially interdigitated flow field, which includes constricted (but not dead-ended) inlet and outlet channels, forces part of the incoming reactant to flow through the porous electrode in order to exit the flow field. In this way, pressure drops may be managed and balanced throughout the flow field. This design also converts the transport of the reactant and product to and from the catalyst layer from a diffusion dominant mechanism to a forced convection dominant mechanism. As a result, the diffusion (stagnant) layer in the backing layer of an electrode may be reduced from the whole backing layer thickness to a much thinner layer.

FIGS. 6A, 6B, and 6C show embodiments of redox plates that comprise interdigitated flow field designs. Similar embodiments may be used for partial interdigitated flow field designs without departing from the scope of this disclosure. Such embodiments may include constricted inlet and outlet flow channels, as opposed to dead-ended inlet and outlet flow channels.

FIG. 6A shows an embodiment of redox plate 600 comprising an interdigitated flow field 605 in accordance with the present disclosure. In one example, redox plate 600 comprises a plurality of interdigitated channels used to distribute fluid. The interdigitated channels include a plurality of alternating dead-ended inlet channels 610 and outlet channels 615 with the same channel depth. The inlet channels 610 and outlet channels 615 are arranged in an alternating fashion to form the interdigitated pattern. The channels are separated by ribs 620. The width and depth of the channels and the width of the ribs may be varied to suit the specific embodiment. The use of dead-ended channels forces the reactant to flow through the porous electrode.

The redox plate may be manufactured from a material with a high (60-100%) graphite composition or other suitable material. The redox plate may include a binder composed of any suitable material, including polyolefins (PE, PP or others), phenolic, vinyl ester, or other thermal set materials, a thermoplastic (such as PPS, PPSU, PEEK, PTFE, PFA), or other inorganic binding materials. As shown in FIGS. 5A and 5B, the bipolar plate and interdigitated channels may be formed of a robust polymer while the ribs may be formed of a C/Graphite composite. In this exemplary design, the channel depths may range from 0.5 to 1.5 mm, but may be deeper or shallower based on the size and design of the flow cell. The channel/land ratio is defined as the ratio between the width of the channels and the land, or interchannel distance minus the channel width. In this example, the channel width is 1 mm, and the interchannel distance is 2 mm, yielding a 1 mm land and a 1.0 channel/land ratio. The channel width and interchannel distance may be modulated in order to produce a channel/land ratio for optimal performance for the specific flow cell application. This ratio may fall within the range of 0.5 to 3.0 but may be smaller or greater depending on the application.

FIG. 6B shows an alternative embodiment of a redox plate 630 comprising an interdigitated flow field 635 in accordance with the present disclosure. Redox plate 630 may be manufactured similarly to redox plate 600. In this embodiment, the inlet channels 640 and outlet channels 645 include a series of steps 650 extending from the channel depth 652 to the plate surface 654. In this example embodiment, there are 8 steps in each channel, but this number may be increased or decreased to change the fluid diffusion to optimize performance specific to the application.

FIG. 6C shows yet another embodiment of a redox plate 660 comprising an interdigitated flow field 665 in accordance with the present disclosure. Redox plate 660 may be manufactured similarly to redox plates 600 and 630. In this embodiment, the inlet channels 670 and outlet channels 675 are ramped or sloped from the channel depth 677 to the plate surface 679. In this embodiment, the fluid is evenly diffused as it enters the active area into the electrode on the membrane electrode assembly.

One challenge the redox flow battery faces is that all the cells are hydraulically connected through an electrolyte circulation path. This can be problematic as shunt current can flow through the electrolyte circulation path from one series-connected cell to another causing energy losses and imbalances in the individual charge states of the cells.

Two losses that may be analyzed when building flow cell stacks are pumping losses and shunt current losses. The pumping losses may arise from pumping the plating electrolyte and redox electrolyte into and out of the flow cells. The shunting current losses may be due to the electrolyte being conductive and small shorts developing due to the electrolyte touching all of the cells. There may be a design to minimize these two losses and it may be defined as:

$$\min(\Sigma \text{Shunting Losses} + \Sigma \text{Pumping losses})$$

In order to reduce the pumping losses, the design requirements may call for short plumbing lengths with the smallest possible velocity (large hydraulic diameter). However, to reduce the shunting losses, the design may require long distances between cells and small plumbing areas.

The shunting losses may include at least two different types. The first type is due to cell to cell shunting (bipolar plate to bipolar plate). These losses can be significant for large stacks since the losses are additive:

$$\#shunts = 2 * \sum_{i=1}^{\#cells-1} i$$

The series is multiplied by two since there may be shunting on the inlet and outlet of the cell. The problem may be significantly worse for large stacks. The loss due to shunting is defined by:

$$\text{Loss} = \frac{V^2}{R}$$

Where R is the resistance of the electrolyte between the two cells and V is the voltage difference between the two cells. To determine the total shunting loss between the cells in the stack:

$$\text{Cell Shunt Loss} = 2 * \sum_{i=1}^{n-1} \sum_{j=i}^{n} \frac{(V_j - V_i)^2}{R_{ij}}$$

Where n is the number of cells in the stack. The losses may add up quickly since cell 1 shorts to cells 2, 3, . . . , n and cell 2 shorts to cells 3, 4, . . . , n. A larger resistance length, and therefore larger R, between cells may reduce this loss. This may be accomplished by adding a dielectric length between each of the bipolar plates. A smaller cell-to-cell voltage different (Vj-Vi) may also reduce this loss. This may be accomplished by separating a large stack into multiple smaller sub-stacks. In accordance with the present disclosure, a plastic frame may be added around the bipolar plate to direct electrolyte flow separately to different sub-stacks.

In some embodiments of the current disclosure, the resistance from cell to cell may be a function of the electrolyte resistivity, flow channel dimensions and the internal manifolds (both inlet and outlet manifolds).

$$R_{ij} = \rho_e \left[ 2 \frac{L_{channel}}{A_{channel}} + (j-i) * \frac{t_{pf}}{A_{manifold}} \right]$$

Where $\rho_e$ is the electrolyte resistivity, $L_{channel}$ is the length of the flow channel in the frame and $A_{channel}$ is the area of the channel defined below. The thickness of the frame is defined as $t_{pf}$ and the area of the internal manifolds is $A_{manifold}$.

To prevent or reduce such shunt currents, properties of the electrolytes used in an IFB, such as electrical and ionic conductivities, are characterized. Based on the above analysis results, shunt currents between cells can be reduced by increasing the ionic resistance between flow inlet and outlet ports. This can be achieved by increasing the length and/or reducing the cross-sectional area of the flow inlet and outlet paths.

Additionally, cells of similar voltages may be grouped to sub-stacks. Each sub-stack may comprise one or more cells. The inlet and outlet channels for reactants may change positions for each individual cell or sub-stack in order to minimize voltage differences and shunt current losses from high voltage cells to low voltage cells. The internal manifolds may be set up such that there is cascading from each Anode IN and Cathode IN, with each cell/sub-stack having reactants in parallel of other cells/sub-stacks.

FIG. 7A shows an embodiment of an internally manifolded frame 700 for a single flow cell in accordance with the present disclosure. Internally manifolded frame 700 may comprise frame 705 and flow field 710. Flow field 710 may be a redox plate or a plating plate. Internally manifolded frame 700 may include both redox and plating plates, and both redox and plating electrodes, although only one flow field is shown here. When included, flow field 710 may be on the top face of internally manifold frame 700, while the second flow field may be located on the bottom face, opposite the top face of internally manifold frame 700. As described herein and with regards to FIGS. 5A and 5B, frame 705 may be manufactured from a robust polymer. Flow field 710 may include flow channels cast as part of frame 705, and may further include conductive inserts for electrical conductivity. Flow channels may be interdigitated or partially interdigitated, and may be sloped or stepped as shown in FIGS. 6A-6C. A plating electrode may be an embodiment of the fin structures as shown in FIGS. 3A-D and 4A-4C.

Frame 705 may include an outer perimeter region 706, and an outer ridge 707. Outer perimeter region 706 and outer ridge 707 may not include routing for electrolyte flow, and may be used to facilitate the stacking of multiple internally manifolded frames into a flow cell stack, as described herein and depicted in FIG. 8A. Frame 705 may further include an inlet/outlet region 708, located interior to outer ridge 707. Frame 705 may further include a flow field region 709 located interior to inlet/outlet region 708.

Internally manifolded frame 700 may include several electrolyte inlet ports 720*a-e* and outlet ports 722*a-e* located within inlet/outlet region 708. Each frame 700 may include a single inlet port 721 and an outlet port 731 configured to direct electrolyte flow to and from flow field 710 via electrolyte flow paths. The remaining ports 720*a-e* and 722*a-e* may be used to direct electrolyte flow to other cells and/or sub-stacks. In the embodiment shown in FIG. 7A, internally manifolded frame 700 has six inlet ports and six outlet ports, facilitating six cells or six sub-stacks, but more or fewer inlet and outlet ports may be included, depending on the battery design. Internally manifolded frame 700 may also include several additional electrolyte inlet ports 723*a-f* and additional outlet ports 724*a-f*. If flow field 710 is a redox flow field, a second flow field on the opposite face of frame 705 may be a plating flow field, or vice-versa. As such, if inlet ports 720*a-e* and 721 route redox electrolyte to frame 705, inlet ports 723*a-f* may route plating electrolyte to frame 705. Similarly to the flow paths shown for flow field 710, one of inlet ports 723*a-f* and one of outlet ports 724*a-f* may be used to route electrolyte to and from a second flow field located on the opposite face from flow field 710. The remaining inlet and outlet ports may route electrolyte to other cells or sub-stacks within the flow cell stack. The inlet and outlet ports may not be located within flow field region 709 in order to maintain electrolyte flow path length, as described herein.

In the example shown in FIG. 7A, internally manifold frame 700 comprises an electrolyte inlet flow path 725 and an electrolyte outlet flow path 755. Electrolyte inlet flow path 725 comprises an inlet to manifold port 721 where electrolyte enters the manifold, electrolyte inlet flow channels 730 where electrolyte flows from the inlet port to the inlet of the battery, electrolyte inlet flow distribution manifold 735, and a plurality of flow field inlets 736. The inlet to manifold port 721 may be coupled to an external tube (not shown). Electrolyte inlet flow distribution manifold 735 may utilize an "ant farm" type of design to distribute electrolyte evenly into flow field 710. Such a configuration is described further herein and with regards to FIG. 7B. Electrolyte inlet flow path 725 may extend around flow field 710 on the border of flow field region 709 and inlet/outlet region 708. In this example, electrolyte inlet flow path 725 includes a first length 725*a* extending from inlet port 721 to first bend 726, a second length 725*b* extending from first bend 726 and second bend 727, and a third length 725*c* extending from second bend 727 to electrolyte inlet flow distribution manifold 735. Lengths 725*a*, 725*b*, and 725*c* may be continuous and allow electrolyte to flow directly from one to another.

In the example shown in FIG. 7A, electrolyte outlet flow path 755 comprises an inlet to manifold port 731 where electrolyte leaves the manifold, electrolyte outlet flow channels 760 where electrolyte flows from the outlet of the battery to the outlet port, electrolyte outlet flow distribution manifold 765, and a plurality of flow field outlets 766. The outlet to manifold port 731 may be coupled to an external tube (not shown). Electrolyte outlet flow distribution manifold 765 may utilize an "ant farm" type of design to distribute electrolyte evenly out of flow field 710. Electrolyte outlet flow path 725 may extend around flow field 710 on the border of flow field region 709 and inlet/outlet region 708. In this example, electrolyte outlet flow path 755 includes a first length 755*a* extending from outlet port 731 to first bend 757, a second length 755*b* extending from first bend 757 to second bend 756, and a third length 755*c* extending from second bend 756 to electrolyte outlet flow distribution manifold 765. Lengths 755*a*, 755*b*, and 755*c* may be continuous and allow electrolyte to flow directly from one to another.

Other flow cells sharing a flow cell stack with internally manifolded frame 700 may use different inlet and outlet ports, and thus require different electrolyte inlet paths and electrolyte outlet paths. For example, internally manifolded frame 700 may be configured to use electrolyte inlet port 720*e* to route electrolyte to the respective flow field 710 and electrolyte outlet port 722*e* to route electrolyte from flow field 710. In such an example, electrolyte inlet flow path 725 would decrease in length. More specifically, the first length 725*a* may be shortened, as it would thus extend from inlet port 720*e* to first bend 726. However, first length 755*a* would be extended, as it would thus extend from outlet port 722*e* to first bend 757. In this way, the combined inlet and outlet path length may remain the same for each internally manifold flow cell within a stack.

FIG. 7B shows an example electrolyte flow path 775 that may be implemented in the internally manifold frame 700 described herein and with regards to FIG. 7A. Electrolyte flow path 775 may be the equivalent of electrolyte inlet flow path 725 and/or electrolyte outlet flow path 755. Electrolyte flow path 775 may include a port 780, a set of flow channels 781, and flow distribution manifold 790. Flow distribution manifold 790 may include a series of junction stages and a series of manifold distribution channel sets fluidly coupling the junction stages. In this example, three junction stages are shown, but more or fewer may be used depending on the flow cell design. In this example, flow distribution manifold 790 includes first junction stage 782, second junction stage 784 and third junction stage 786. Flow distribution manifold 790 also includes a first set of manifold distribution channels 783 coupled between first junction stage 782 and second junction stage 784, and a second set of manifold distribution channels 785 coupled between second junction stage 784 and third junction stage 786. The second set of manifold distribution channels 785 may include a larger number of channels than does first set 783. Manifold distribution channels 785 may have a longer path length than do first set 783. Third junction stage 786 may be coupled to an additional set of manifold distribution channels, which may be further coupled to additional junction stages and additional sets of manifold distribution channels, with electrolyte flow eventually being distributed to a plating or redox flow field.

In the example where flow distribution manifold 790 is utilized as an inlet flow distribution manifold, electrolyte may enter port 780, which may be configured as an electrolyte inlet port. Port 780 may then distribute electrolyte through electrolyte flow channels 781, which may be configured as electrolyte inlet flow channels. Electrolyte flow channels 781a and 781b, (and others, where included) may have the same path length. Electrolyte flow channels 781 may then distribute electrolyte to first junction stage 782, and then be distributed to first set of manifold distribution channels 783. Individual manifold distribution channels in first set 783 may have the same path length. Electrolyte may then enter second junction stage 784, and then be distributed to second set of manifold distribution channels 785, and further to third junction stage 786.

Individual manifold distribution channels in second set 785 may have the same path length. For example, distribution channel 785a may have the same path length as distribution channel 785b. However, due to space constraints, channels 785a and 785b may have different architecture. As shown, channel 785a has a single turn, while channel 785b has a first and second turn. In this way, pressure drops may be minimized as electrolyte flows separate and pressure drops to each channel may be equalized by ensuring same electrolyte flow path length and geometries.

In the example where flow distribution manifold 790 is utilized as an outlet flow distribution manifold, electrolyte may enter third junction stage 786 and then be distributed to second set of manifold distribution channels 785. Electrolyte may then flow to second junction stage 784, first set of manifold distribution channels 783, and first junction stage 782. Electrolyte may then flow to flow channels 781, which may be configured as electrolyte outlet flow channels and to port 780, which may be configured as an electrolyte outlet port.

FIG. 8A shows an exemplary flow cell stack 800 in accordance with the present disclosure. Flow cell stack 800 includes of a plurality of flow cell sub-stacks 810. Each sub-stack may be composed of one or multiple cells. In this example embodiment, the flow channels (or manifolds) are kept fully within the stack, yielding an internally manifolded flow cell stack. In this example, each flow manifold has six sets of identical flow inlet ports 820 and outlet ports (not shown) aligned but including different flow inlet and outlet flow paths for redox and plating electrolytes of different sub-stacks. Each sub-stack 810 includes an inlet port 825 connecting electrolyte flow to a flow field as described herein and shown in FIG. 7A. Each sub-stack 810 also includes channels 830 directing electrolyte flow to other sub-stacks within flow cell stack 800. Electrolyte exiting outlet ports within flow cell stack 800 may be combined at a common electrolyte outlet (not shown). As shown in FIG. 7A, each flow cell in the flow cell stack includes an inlet electrolyte path and an outlet electrolyte path. By changing the location of the inlet and outlet ports, the lengths of the inlet electrolyte paths and outlet electrolyte paths may change from flow cell to flow cell. In order to maintain the same pressure drop across each flow cell, the sum of the inlet electrolyte path length and the outlet electrolyte path length may be kept the same for each cell within flow cell stack 800.

Figure 8B:
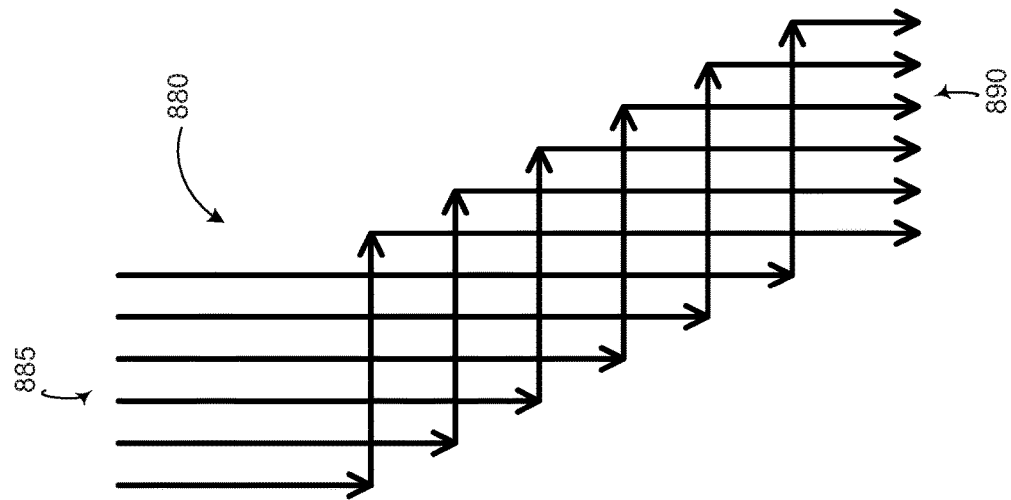
FIG. 8B shows a diagram of electrolyte flow through the flow cell stack depicted in FIG. 8A.
Figure 8A:
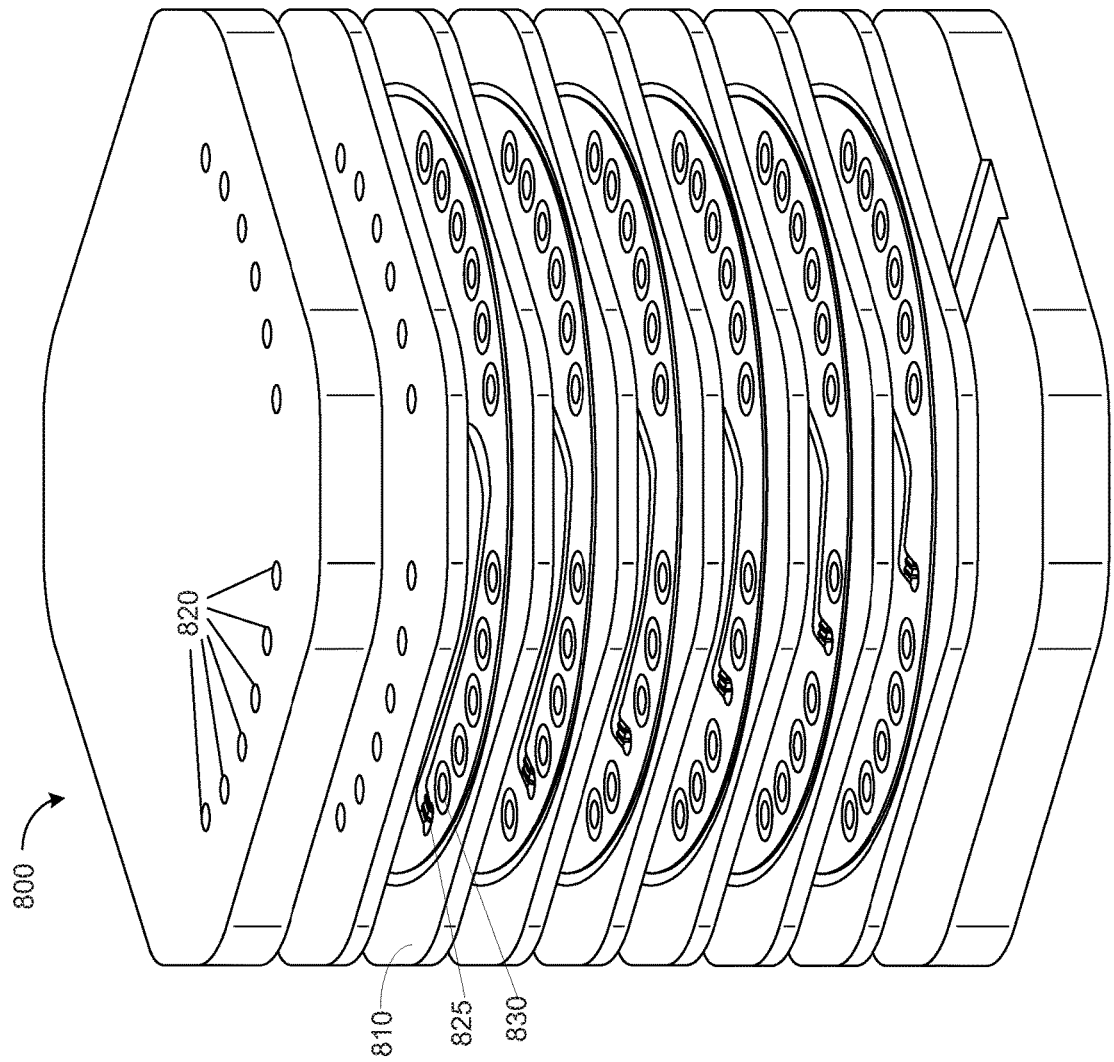
FIG. 8A shows, in schematic detail, an embodiment of a flow cell stack in accordance with the current disclosure.

FIG. 8B shows an example of fluid flow direction 880 through an IFB stack comprised of six sub-stacks (or six cells). Flow may enter an IFB stack at 385, through inlet ports, such as inlet ports 820 as shown in FIG. 8A. Fluid entering the first port (leftmost, as shown in FIG. 8B) may flow through the inlet manifold port of the first sub-stack, enter a flow field within the sub-stack, and exit an outlet port of the first sub-stack. Electrolyte may then flow through a channel, bypassing the remaining sub-stacks, and exiting the flow cell stack at 890.

Similarly, fluid entering the second port may flow through a channel bypassing the first sub-stack, then flowing through an inlet manifold of the second sub-stack, entering a flow field and exiting from an outlet manifold port. The electrolyte may then flow through a channel, bypassing the remaining sub-stacks and exiting the flow cell stack at 890. Similarly, electrolyte may be directed to and from sub-stacks 3-6 in this example.

By separating the electrically conductive electrolyte paths, voltage differences between cells are managed and shunt current losses between cells are minimized, thus increasing the performance of the battery.

In accordance with the present disclosure, one way to minimize the cell to cell shunting losses due to the high voltage difference may be to break the stack up into smaller stacks or build sub-stacks within a single stack. Smaller stacks are not cost effective since there would be redundancy on non-repeat parts such as pressure plates and current collectors, so internal sub-stacks are assumed in this analysis. With internal sub-stacks different electrolyte feeds to and from the stack are employed and each feed provides electrolyte to that specific sub-stack. The shunting loss in this case is defined as:

$$\text{Substack Shunt Loss} = 2 * \sum_{i=1}^{n-1} \sum_{j=i}^{n} \frac{(V_j - V_i)^2}{R_{ij}}$$

Where n is the number of sub-stacks, V is the sub-stack average voltage and R is the resistance between sub-stacks. As can be seen, it is advantageous to have a large resistance between sub-stacks. This resistance may be obtained by using long external plumbing. In this case the resistance, Rij, is defined as:

$$R_{ij} = \rho_e \left[ \frac{2 * L_{channel}}{\#SS * A_{channel}} + 2 \frac{L_{tube}}{A_{tube}} + (I + j - 2) \frac{L_{manifold}}{A_{manifold}} \right]$$

Where $L_{tube}$ is the external tube length and $A_{tube}$ is the tube area.

The pumping losses may be broken up into at least four different areas including: inlet and outlet tubing, inlet and outlet internal manifolds, the frame flow channel, and the redox or plating plate. The pressure drop associated with the redox or plating plate is set due to its design. In an exemplary embodiment where the tubing is circular, the hydraulic diameter of the tubing may be defined as the diameter of the tubing, and the pressure drop in the inlet and outlet tubing and internal manifolds may be a function of said hydraulic diameter.

The pumping loss is defined as:

$$\text{Pumping loss} = \frac{\Delta P * Q}{\eta}$$

Where $\Delta P$ is the pressure drop in the plumbing (Pa), Q is the flow rate (m$^3$/s) and $\eta$ is the pump efficiency. The pressure drop is defined from the Darcy-Weisbach equation as:

$$\Delta P = \frac{1}{2} * f_d * \frac{L}{D_h} * \rho * v^2$$

Where $f_d$ is the friction factor, L is length (meters), $D_h$ is the hydraulic diameter (meters), $\rho$ is the density (kg/m$^3$) and $v$ is the velocity of the electrolyte (m/s). The friction factor is calculated assuming laminar flow by:

$$f_d = \frac{64}{Re}$$

And Re is the Reynolds number defined as:

$$Re = \frac{v * D_h}{\mu}$$

Where $\mu$ is the kinematic viscosity (m$^2$/s).

When analyzing pumping losses in the frame, circular tubes cannot be assumed since the channels will be added to a flat sheet, so the hydraulic diameter needs to be calculated. To minimize pumping losses the perimeter of the channel may be minimized, while maximizing the area of the channel. In accordance with the present disclosure, a modified half circle may be machined in the channel. The hydraulic diameter of a non-circular channel may be calculated by:

$$D_h = \frac{4 * A}{P}$$

Where A is the cross sectional area of the channel and P is the channel perimeter. In some embodiments a channel width and depth may be allocated. Based on these two variables the optimal hydraulic diameter may be determined for at least the following scenarios:

Type 1: If Channel Depth=Channel Width/2 then $$\text{Channel Area} = \frac{\pi}{4} D_{channel}^2$$

-continued $$\text{Channel Perimenter} = \pi * D_{Channel} + W_{Channel}$$

Type 2: If Channel Depth>Channel Width/2 then $$\text{Channel Area} = \frac{\pi * W_{channel}^2}{16} + \left(D_{Channel} - \frac{W_{Channel}}{2}\right) * W_{Channel}$$

$$\text{Channel Perimenter} = \pi * \frac{W_{Channel}}{2} + 2 * \left(D_{Channel} - \frac{W_{Channel}}{2}\right) * W_{Channel}$$

Type 3: If Channel Depth<Channel Width/2 then $$\text{Channel Area} = \frac{\pi * D_{Channel}^2}{4} + (W_{Channel} - D_{Channel}) * D_{Channel}$$

$$\text{Channel Perimenter} = \pi * D_{Channel} + (W_{Channel} - D_{Channel}) * W_{Channel}$$

Depending on the maximum depth constraints of the picture frame, any of these or other channel configurations may be used—in order to minimize both the pumping losses and shunt current losses.

The systems described herein, and with reference to FIGS. 1, 2, 7A, 7B, 8A, and 8B may enable one or more systems. In one example, a system for a flow cell for a flow battery, comprising: a first flow field; and a polymeric frame, comprising: a top face; a bottom face, opposite the top face; a first side; a second side, opposite the first side; a first electrolyte inlet located on the top face and the first side of the polymeric frame; a first electrolyte outlet located on the top face and the second side of the polymeric frame; a first electrolyte inlet flow path located within the polymeric frame and coupled to the first electrolyte inlet; and a first electrolyte outlet flow path located within the polymeric frame and coupled to the first electrolyte outlet. The polymeric frame may further comprise: a first inlet flow manifold located within the polymeric frame and coupled between the first electrolyte inlet flow path and the first flow field; and a first outlet flow manifold located within the polymeric frame and coupled between the first electrolyte outlet flow path and the first flow field. The system may further comprise a second flow field; and the polymeric frame may further comprise: a second electrolyte inlet located on the bottom face and the first side of the polymeric frame; a second electrolyte outlet located on the bottom face and the second side of the polymeric frame; a second electrolyte inlet flow path located within the polymeric frame and coupled to the first electrolyte inlet; and a second electrolyte outlet flow path located within the polymeric frame and coupled to the first electrolyte outlet. The first electrolyte inlet flow path may include one or more electrolyte inlet flow channels, and the first electrolyte outlet flow path includes one or more electrolyte outlet flow channels. The one or more electrolyte inlet flow channels and one or more electrolyte outlet flow channels may have a cross section in the shape of a half-circle or within 10° of a half-circle. A depth of the one or more electrolyte inlet flow channels may be twice a width of the one or more electrolyte inlet flow channels and a depth of the one or more electrolyte outlet flow channels may be twice a width of the one or more electrolyte outlet flow channels.

In another example a system for a flow cell stack for a flow battery, comprising: two or more electrolyte inlet feeds; two or more electrolyte outlet feeds; and two or more flow cells, each flow cell comprising: a first flow field plate; a second flow field plate; and a polymeric frame, comprising: a top face; a bottom face; a first side; a second side, opposite the first side; a first electrolyte inlet located on the top face and the first side of the polymeric frame; a first electrolyte outlet located on the top face and the second side of the polymeric frame; a first electrolyte inlet flow path located within the polymeric frame and coupled to the first electrolyte inlet; a first electrolyte outlet flow path located within the polymeric frame and coupled to the first electrolyte outlet; a second electrolyte inlet located on the bottom face and the first side of the polymeric frame; a second electrolyte outlet located on the bottom face and the second side of the polymeric frame; a second electrolyte inlet flow path located within the polymeric frame and coupled to the first electrolyte inlet; and a second electrolyte outlet flow path located within the polymeric frame and coupled to the first electrolyte outlet. In this way, the electrolyte inlets and outlets may be separated for each flow cell, thereby managing voltage differences between cells and increasing the performance of the battery. The two or more electrolyte inlet feeds may be coupled to an inlet manifold located within the flow cell stack. The two or more electrolyte outlet feeds may be coupled to an outlet manifold located within the flow cell stack. The two or more electrolyte inlet feeds may be coupled to an electrolyte tank via an electrolyte pump. The flow cell stack may further comprise two or more sub-stacks, each sub-stack comprising one or more flow cells. Each sub-stack may be coupled to a separate electrolyte feed, such that each sub-stack receives electrolyte independently from all other sub-stacks.

In yet another example, a system for an all-iron hybrid flow battery, comprising: a redox electrolyte tank including a redox electrolyte; a plating electrolyte tank including a plating electrolyte; and a power module coupled to the redox electrolyte tank via a first pump and further couple to the plating electrolyte tank via a second pump, the power module comprising an internally manifolded flow cell stack. the internally manifolded flow cell stack comprising: two or more electrolyte feeds connected to the redox electrolyte tank and/or the plating electrolyte tank; a first sub-stack comprising at least a first flow cells coupled to a first electrolyte feed; and a second sub-stack comprising at least a second flow cells coupled to a second electrolyte feed. The first sub-stack may further comprise: one or more flow cells coupled to the first electrolyte feed, the one or more flow cells having similar voltages, the voltages being significantly different from a voltage of the at least one flow cell of the second sub-stack. The one or more flow cells may further comprise: a first flow field; and a polymeric frame, comprising: a top face; a bottom face, opposite the top face; a first side; a second side, opposite the first side; a first electrolyte inlet located on the top face and the first side of the polymeric frame; a first electrolyte outlet located on the top face and the second side of the polymeric frame; a first electrolyte inlet flow path located within the polymeric frame and coupled to the first electrolyte inlet; and a first electrolyte outlet flow path located within the polymeric frame and coupled to the first electrolyte outlet. The one or more flow cells may further comprise: a first inlet flow manifold located within the polymeric frame and coupled between the first electrolyte inlet flow path and the first flow field; and a first outlet flow manifold located within the polymeric frame and coupled between the first electrolyte outlet flow path and the first flow field. The one or more flow cells may further comprise: a second flow field; and wherein the polymeric frame further comprises: a second electrolyte inlet located on the bottom face and the first side of the polymeric frame; a second electrolyte outlet located on the bottom face and the second side of the polymeric frame; a second electrolyte inlet flow path located within the polymeric frame and coupled to the first electrolyte inlet; and a second electrolyte outlet flow path located within the polymeric frame and coupled to the first electrolyte outlet. The first electrolyte inlet flow path may include one or more electrolyte inlet flow channels, and the first electrolyte outlet flow path includes one or more electrolyte outlet flow channels. The first electrolyte feed may be coupled to the first sub-stack via a third pump, and the second electrolyte feed is coupled to the second sub-stack via a fourth pump. The redox electrolyte and the plating electrolyte may be $FeCl_2$, $FeCl_3$, $FeSO_4$, or $Fe_2(SO_4)_3$ solutions.

It will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A system for a flow cell stack for a flow battery, comprising:
    two or more electrolyte inlet feeds;
    two or more electrolyte outlet feeds; and
    two or more flow cells, each flow cell comprising:
        a first flow field plate;
        a second flow field plate; and
        a polymeric frame, comprising:
            a top face;
            a bottom face;
            a first side;
            a second side, opposite the first side;
            a first electrolyte inlet located on the top face and the first side of the polymeric frame;
            a first electrolyte outlet located on the top face and the second side of the polymeric frame;
            a first electrolyte inlet flow path located within the polymeric frame and coupled to the first electrolyte inlet;
            a first electrolyte outlet flow path located within the polymeric frame and coupled to the first electrolyte outlet;
            a second electrolyte inlet located on the bottom face and the first side of the polymeric frame;
            a second electrolyte outlet located on the bottom face and the second side of the polymeric frame;
            a second electrolyte inlet flow path located within the polymeric frame and coupled to the first electrolyte inlet; and
            a second electrolyte outlet flow path located within the polymeric frame and coupled to the first electrolyte outlet,
        wherein the first electrolyte inlet flow path wraps around a first side, a second side, and a third side of the first flow field plate.

2. The system of claim 1, wherein the two or more electrolyte inlet feeds are coupled to an inlet manifold located within the flow cell stack, wherein the inlet manifold comprises one or more junction stages and a series of manifold distribution channel sets fluidly coupling the junction stages.

3. The system of claim 1, wherein the two or more electrolyte outlet feeds are coupled to an outlet manifold located within the flow cell stack.

4. The system of claim 1, wherein the two or more electrolyte inlet feeds are coupled to an electrolyte tank via an electrolyte pump.

5. The system of claim 1, wherein the flow cell stack further comprises two or more sub-stacks, each sub-stack comprising one or more flow cells.

6. The system of claim 5, wherein each sub-stack is coupled to a separate electrolyte feed, such that each sub-stack receives electrolyte independently from all other sub-stacks.

7. The system of claim 1, wherein the polymeric frame comprises an inlet/outlet region, wherein an outer ridge surrounds the inlet/outlet region.

8. The system of claim 1, wherein each flow cell comprises a redox plate, a redox electrode, a barrier, and a plating electrode.

9. The system of claim 8, wherein the plating electrode comprises a plurality of fins having a plicate structure, wherein the fins comprise a cross-sectional shape that is sinusoidally curved, square, or trapezoidal.

10. The system of claim 1, wherein the flow cell stack is one of a plurality of fluidically isolated substacks in a battery.

* * * * *